(12) United States Patent
Fusegi et al.

(10) Patent No.: US 6,959,799 B2
(45) Date of Patent: *Nov. 1, 2005

(54) ACTUATOR AND INTERMISSIVE POWER TRANSMISSION DEVICE THEREWITH

(75) Inventors: Masaaki Fusegi, Tochigi-ken (JP); Masashi Aikawa, Tochigi (JP); Masao Teraoka, Sano (JP); Tetsushi Tomita, Utsunomiya (JP); Noriyuki Sudou, Kanuma (JP)

(73) Assignee: Tochigi Fuji Sangyo Kabushiki Kaisha, Tochigi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/635,784

(22) Filed: Aug. 5, 2003

(65) Prior Publication Data

US 2004/0142786 A1 Jul. 22, 2004

(30) Foreign Application Priority Data

Aug. 6, 2002 (JP) ........................................ 2002-228498
Sep. 10, 2002 (JP) ........................................ 2002-263989

(51) Int. Cl.$^7$ ............................................. F16H 48/20
(52) U.S. Cl. .................... 192/84.6; 192/93 A; 475/150; 475/231
(58) Field of Search ................................ 192/69.8, 84.6, 192/93 A; 475/148–150, 231, 237

(56) References Cited

U.S. PATENT DOCUMENTS

| | | | | | |
|---|---|---|---|---|---|
| 4,805,486 | A | * | 2/1989 | Hagiwara et al. | 475/150 |
| 4,950,214 | A | * | 8/1990 | Botterill | 475/231 |
| 5,080,640 | A | * | 1/1992 | Botterill | 475/231 |
| 6,561,939 | B1 | * | 5/2003 | Knapke | 475/150 |
| 2003/0184171 | A1 | * | 10/2003 | Teraoka et al. | 310/80 |

FOREIGN PATENT DOCUMENTS

| JP | 01049740 A | * | 2/1989 | ............. F16H/1/44 |
|---|---|---|---|---|
| JP | H05-54574 | | 8/1993 | |

* cited by examiner

Primary Examiner—Richard M. Lorence
(74) Attorney, Agent, or Firm—Morrison & Foerster, LLP

(57) ABSTRACT

An actuator for engagement and disengagement operation of a power transmission device is provided with a first plate being fixed, a second plate being movable in a direction of the engagement and disengagement operation so as to be engaged with the first plate, a third plate disposed opposite to the second plate with respect to the first plate, the third plate being rotatably engaged with the second plate, a drive unit engageable with the third plate so as to rotate the third plate, a cam mechanism converting a rotation of the third plate to a movement of the second plate in the direction of the engagement and disengagement operation and a retaining device restricting a relative rotation range of the third plate with respect to the drive unit. The second plate moved by the cam mechanism drives the power transmission device in the direction of the engagement and disengagement operation so as to intermit a power transmission thereof.

16 Claims, 21 Drawing Sheets

LOCK

FREE

ACTUATOR AND INTERMISSIVE POWER TRANSMISSION DEVICE THEREWITH

BACKGROUND OF THE INVENTION

1. Field of the Invention

The present invention relates to an actuator which can obtain a high reliability in spite of a simple structure, and an intermissive power transmission device using the same.

2. Description of the Related Art

There has been proposed a power transmission device such as a differential gear or the like which is provided with an actuator, in order to control a power transmission. Japanese Patent Publication (Examined) No. H05-54574 discloses a related art relating to a power transmission device provided with an actuator utilizing an air pressure.

According to the related art mentioned above, the actuator is constituted by a cylinder fixed to a differential carrier, a piston and the like, is activated by being supplied an air pressure from an air pump driven by an engine, moves a clutch ring via the piston and a shift fork, and engages a claw clutch. Further, when stopping the supply of the air pressure, an engagement of the claw clutch is cancelled.

SUMMARY OF THE INVENTION

According to the related art mentioned above, since the structure becomes complex, a defect such as an increase of weight or the like is unavoidable. Further, since the device utilizes the air pressure, it is hard to avoid a trouble caused by an air leakage or the like, and there is concern about lowering a reliability. In order to avoid the trouble mentioned above, it is necessary to make provision of reinforcing a seal in an air pressure system or the like, and this causes a more complex structure.

The present invention has been achieved in view of the above problem, and an object of the present invention is to provide an actuator which can obtain a high reliability in spite of a simple structure, and a power transmission device using the same.

According to a first aspect of the present invention, an actuator for engagement and disengagement operation of a power transmission device is provided with a first plate being fixed, a second plate being movable in a direction of the engagement and disengagement operation so as to be engaged with the first plate, a third plate disposed opposite to the second plate with respect to the first plate, the third plate being rotatably engaged with the second plate, a drive unit engageable with the third plate so as to rotate the third plate, a cam mechanism converting a rotation of the third plate to a movement of the second plate in the direction of the engagement and disengagement operation and a retaining device retaining an engagement of the third plate with the drive unit wherein the second plate moved by the cam mechanism drives the power transmission device in the direction of the engagement and disengagement operation.

Preferably the second plate is provided with a gear portion and the power transmission device is provided with a pinion gear for engagement with the gear portion. More preferably, the retaining device is a guide portion surrounding the gear portion, both ends of which is integrally connected with the gear portion, and the both ends of the guide portion abut the pinion gear so as to retain the engagement.

Preferably the retaining device is a stopper formed on the first plate for restricting a rotation span of the third plate. More preferably, the third plate is an absorber abutting the stopper. More preferably, the absorber is a resilient piece. More preferably, the third plate is provided with a thick wall portion for abutting the stopper.

Preferably the retaining device is an absorber formed on the first plate for restricting a rotation span of the third plate. More preferably, the absorber is a resilient piece or a spring.

Preferably the retaining device is a folded portion of the third plate surrounding an end portion of the first plate.

Preferably the actuator is further provided with a deceleration device decelerating the third plate after the third plate drives the cam mechanism and before the retaining device restricts the rotation of the third plate. More preferably, the deceleration device is a projection integrally formed with the first plate so as to decelerate the third plate by a friction.

Preferably the drive unit is an electric motor.

According to a second aspect of the present invention, an intermissive power transmission device is provided with a pair of power transmission members, a pair of clutches for intermission of power transmission, a first plate being fixed, a second plate being movable in a direction of the engagement and disengagement operation so as to be engaged with the first plate, a third plate disposed opposite to the second plate with respect to the first plate, the third plate being rotatably engaged with the second plate, a drive unit engageable with the third plate so as to rotate the third plate, a cam mechanism converting a rotation of the third plate to a movement of the second plate in the direction of the engagement and disengagement operation and a retaining device retaining an engagement of the third plate with the drive unit wherein the second plate moved by the cam mechanism drives the power transmission device in the direction of the engagement and disengagement operation.

Preferably the first plate, the second plate and the third plate are respectively and integrally formed from a flat material.

DETAILED DESCRIPTION OF THE PREFERRED EMBODIMENT

A description will be given below of a first embodiment according to the present invention with reference to FIGS. 1 to 8. The following description is given of an example in which a rear differential of a four-wheel drive vehicle is exemplified as a power transmission device and an actuator is applied to a switching control between a two-wheel drive and a four-wheel drive. However, the present invention can be applied to a control of the other various power transmission devices such as a clutch or the like. Further, the actuator can be applied to a switching control between a lock state and an unlock state of right and left differentials.

Figure 1:
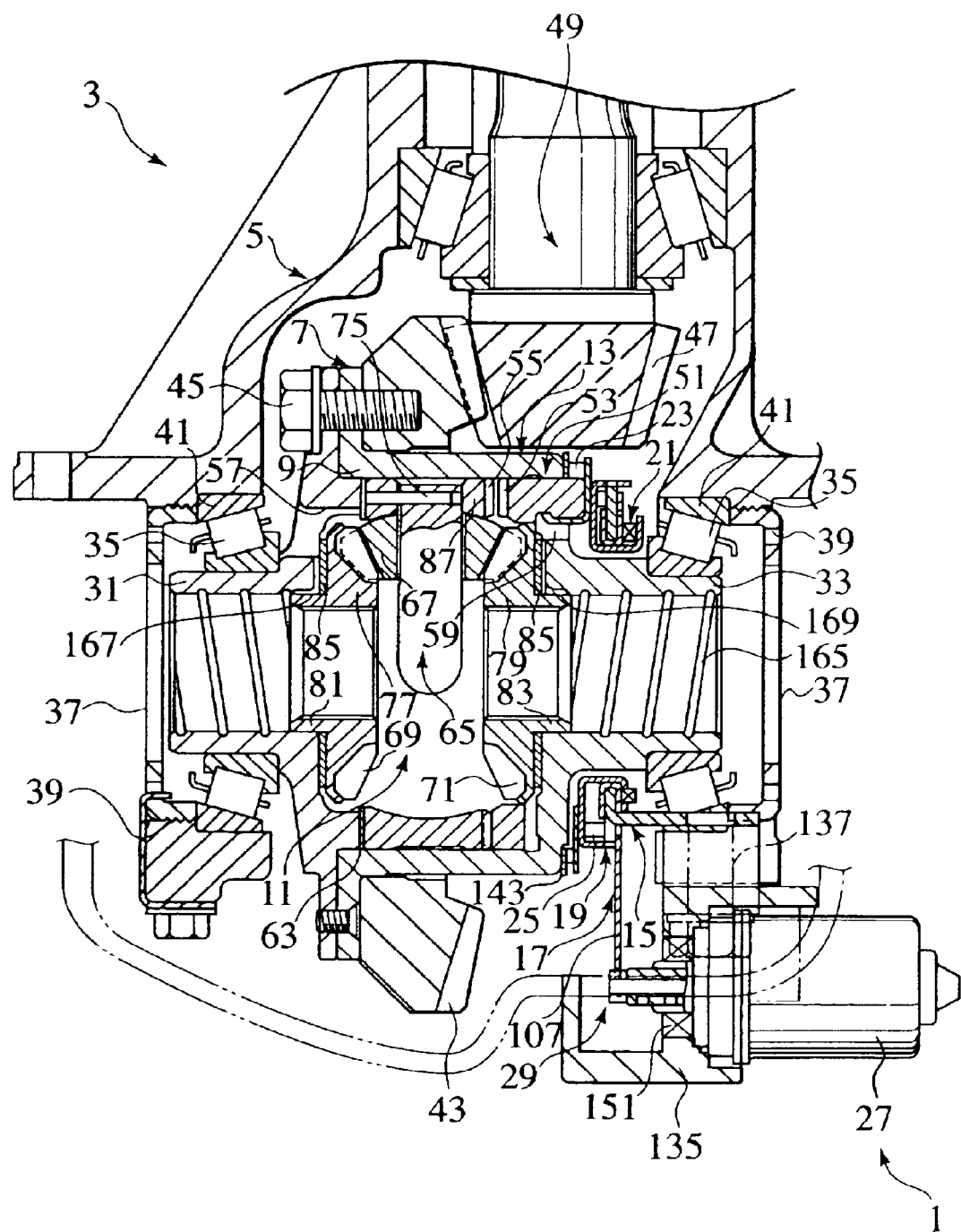
FIG. 1 is a cross sectional view of an actuator and a power transmission apparatus according to a first embodiment of the present invention.

FIG. 1 shows a rear differential 3, and a lateral direction corresponds to a lateral direction in the four-wheel drive vehicle in which the rear differential 3 is employed.

The rear differential 3 (a differential unit for distributing a drive force of an engine to right and left rear wheels) is a differential unit provided with a differential mechanism, an input side of which has an intermissive function of the drive force transmission. The rear differential 3 is employed in the four-wheel drive vehicle and disconnects the drive force to the rear wheel at the two-wheel drive time.

A power transmission system of the four-wheel drive vehicle in which the rear differential 3 is employed is constituted by an engine (a motor), a transmission, a transfer, a 2–4 switching (switching between a two-wheel drive state and a four-wheel drive state) mechanism, a front differential (a differential unit for distributing the drive force of the engine to right and left front wheels), a front axle, the right and left front wheels, a propeller shaft of rear wheels, the rear differential 3, a rear axle, right and left rear wheels and the like.

The 2–4 switching mechanism constitutes a rear wheel output interface of the transfer, is disconnected and connected at the same time of the rear differential 3 in the following manner, and transmits the drive force to the rear wheels in an intermissive manner.

The drive force of the engine is transmitted to the transfer from the transmission, and is distributed from the transfer to the front wheels and the rear wheels.

The drive force distributed to the front wheels is distributed to the right and left wheels from the front differential via the front axle.

Further, the drive force distributed to the rear wheels is transmitted to the rear differential 3 from the 2–4 switching mechanism and the rear wheel propeller shaft during the connection of the 2–4 switching mechanism and the rear differential 3, and is distributed to the right and left rear wheels from the rear differential 3 via the rear axle, whereby the vehicle becomes under the four-wheel drive state.

Further, when canceling the connection of the 2–4 switching mechanism and the rear differential 3, respectively, the rear wheels is detached from the engine and the vehicle becomes under the two-wheel drive state.

The rear differential 3 is disposed in the inner portion of the differential carrier 5, and an oil reservoir is formed in an inner portion of the differential carrier 5.

The rear differential 3 is constituted by an actuator 1, an outer differential case 7, an inner differential case 9, a bevel gear type differential mechanism 11, a dog clutch 13 (a device object to an operation: a clutch), and the like.

Further, the actuator 1 is constituted by a support plate 15 (a first plate), a cam plate 17 (a third plate), a movable plate 19 (a second plate), cams 21 (a cam mechanism), a return spring 23, a shift spring 25, an electric motor 27 (a drive unit), a gear set 29, a controller and the like.

The rear differential 3 is formed as a double casing structure comprising the outer differential case 7 and the inner differential case 9, and the inner differential case 9 is supported so as to freely slidably rotate in an inner periphery of the outer differential case 7. Further, left and right boss portions 31 and 33 formed in the outer differential case 7 are respectively supported to the differential carrier 5 via thrust bearings 35.

Bearing caps 37 are screwed to the differential carrier 5 by a screw portion 39. An outer race 41 is moved in an axial direction by rotating the bearing caps 37 by means of the screw portion 39, whereby a pre-load of each of the thrust bearings 35 is adjusted.

A ring gear 43 is fixed to the outer differential case 7 by a bolt 45. The ring gear 43 is engaged with a drive pinion gear 47, and the drive pinion gear 47 is integrally formed with a drive pinion shaft 49. The drive pinion shaft 49 is connected to the 2–4 switching mechanism of the transfer via a joint, a propeller shaft in the rear wheels and the like, and the drive force of the engine rotates the outer differential case 7 from the transfer and the 2–4 switching mechanism via the rear wheel power transmission system.

A clutch ring 51 is disposed in an inner portion of the outer differential case 7, and is supported so as to freely move in an axial direction in an inner periphery of the outer differential case 7.

The dog clutch 13 is constituted by a mating gear 53 and a mating gear 55. The mating gear 53 is formed in a left end portion of the clutch ring 51, and the mating gear 55 is formed in a right end portion of the inner differential case 9.

Further, openings 57 and 59 which oil flows into and out of respectively are provided in left and right sides of the outer differential case 7 at even intervals in a peripheral direction. Four leg portions 61 are provided in a right end of the clutch ring 51 at even intervals in a peripheral direction, and these leg portions 61 are engaged with the right opening 59 and protrude to an outer portion.

The clutch ring 51 is operated so as to be moved to the right and the left by the actuator 1 as mentioned below. When the clutch ring 51 is operated so as to be moved to the left, the dog clutch 13 is engaged as shown in a lower half of FIG. 1, whereby the outer differential case 7 and the inner differential case 9 are connected. When the clutch ring 51 is returned to the right, the engagement of the dog clutch 13 is canceled as shown in an upper half of FIG. 1, whereby the outer differential case 7 and the inner differential case 9 are disconnected.

A thrust washer 63 exposed to an operating force output from the actuator 1 is disposed between a left end portion of the inner differential case 9 and the outer differential case 7, and the inner differential case 9 is positioned to a left side in an axial direction via the thrust washer 63.

The bevel gear type differential mechanism 11 is constituted by a plurality of pinion shafts 65, pinion gears 67, left and right side gears 69 and 71 in an output side, and the like.

A leading end of each of the pinion shaft 65 is engaged with a through hole 73 formed at even intervals in a peripheral direction of the inner differential case 9, and a displacement prevention is applied by a spring pin 75.

The pinion gears 67 are rotatably supported on the respective pinion shafts 65, and the side gears 69 and 71 are engaged with the pinion gears 67 from the left and the right.

Respective boss portions 77 and 79 of the side gears 69 and 71 are supported by support portions 81 and 83 formed in the outer differential case 7, and left and right rear axles are respectively spline-connected to the respective boss portions 77 and 79.

Further, thrust washers 85 are respectively disposed between the respective side gears 69 and 71 and the outer differential case 7, and are exposed to an engagement thrust force of the side gears 69 and 71.

Spherical washer portions 87 are formed in an inner periphery of the inner differential case 9, which are respectively opposed to back surfaces of the respective pinion gears 67, and bear a centrifugal force of the pinion gears 67 and engagement reaction force applied to the pinion gears 67 due to the engagement with each of the side gears 69 and 71.

Figure 2:
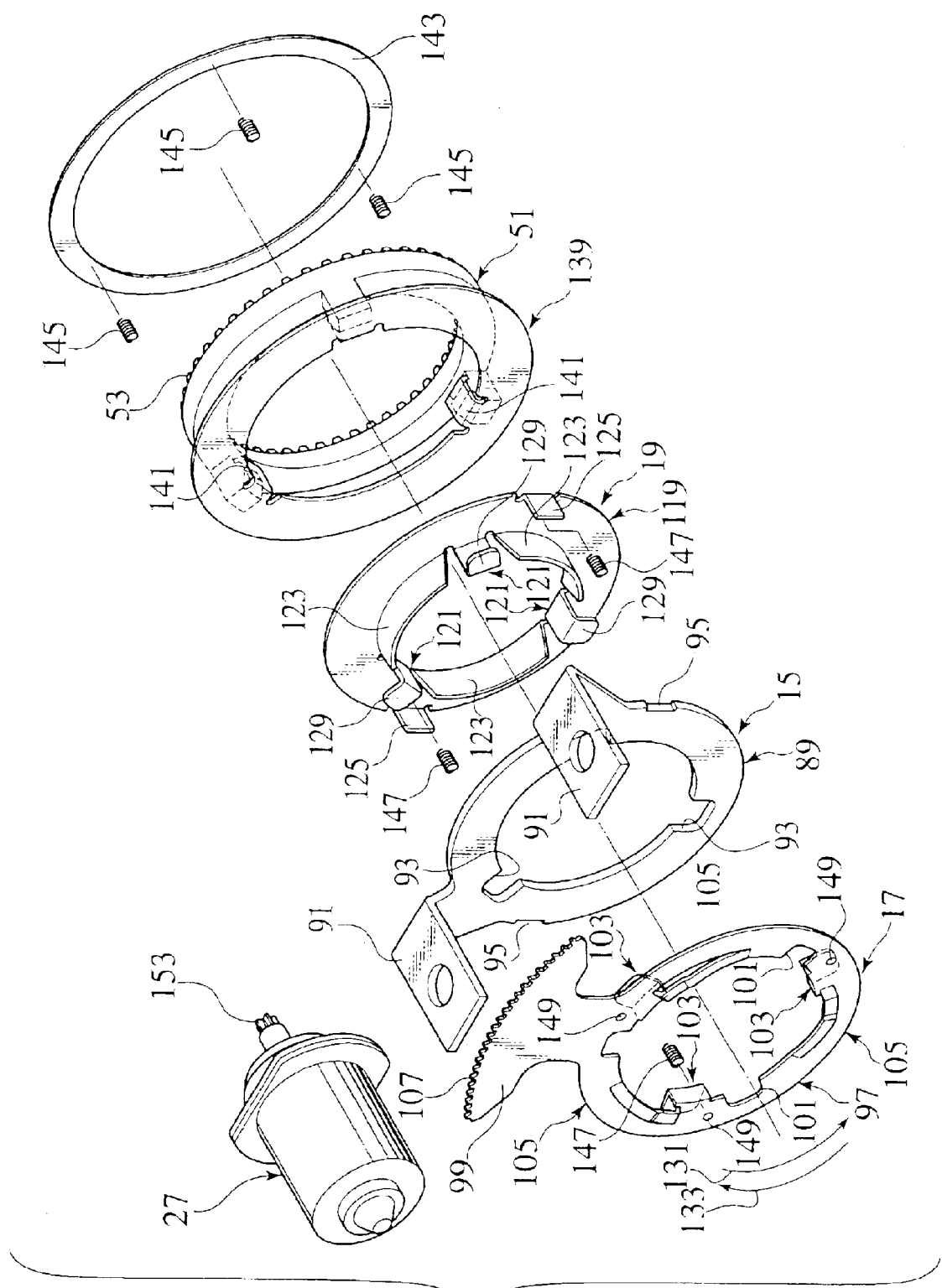
FIG. 2 is an exploded perspective view of the actuator according to the first embodiment of the present invention.

The support plate 15 of the actuator 1 is press-formed, and is constituted, as shown in FIG. 2, by an annular plate portion 89, two fixed plate portions 91 integrally formed with the annular plate portion 89, three assembly recess portions 93 provided in an inner periphery of the annular plate portion 89 at even intervals in a peripheral direction, two guide grooves 95 provided in an outer periphery of the annular plate portion 89 at even intervals in a peripheral direction, and the like. The support plate 15 has a slightly larger thickness than that of the movable plate 19 and the cam plate 17, in order to stand against an axial force applied by the cams 21 and the springs 23 and 25.

Figure 8:
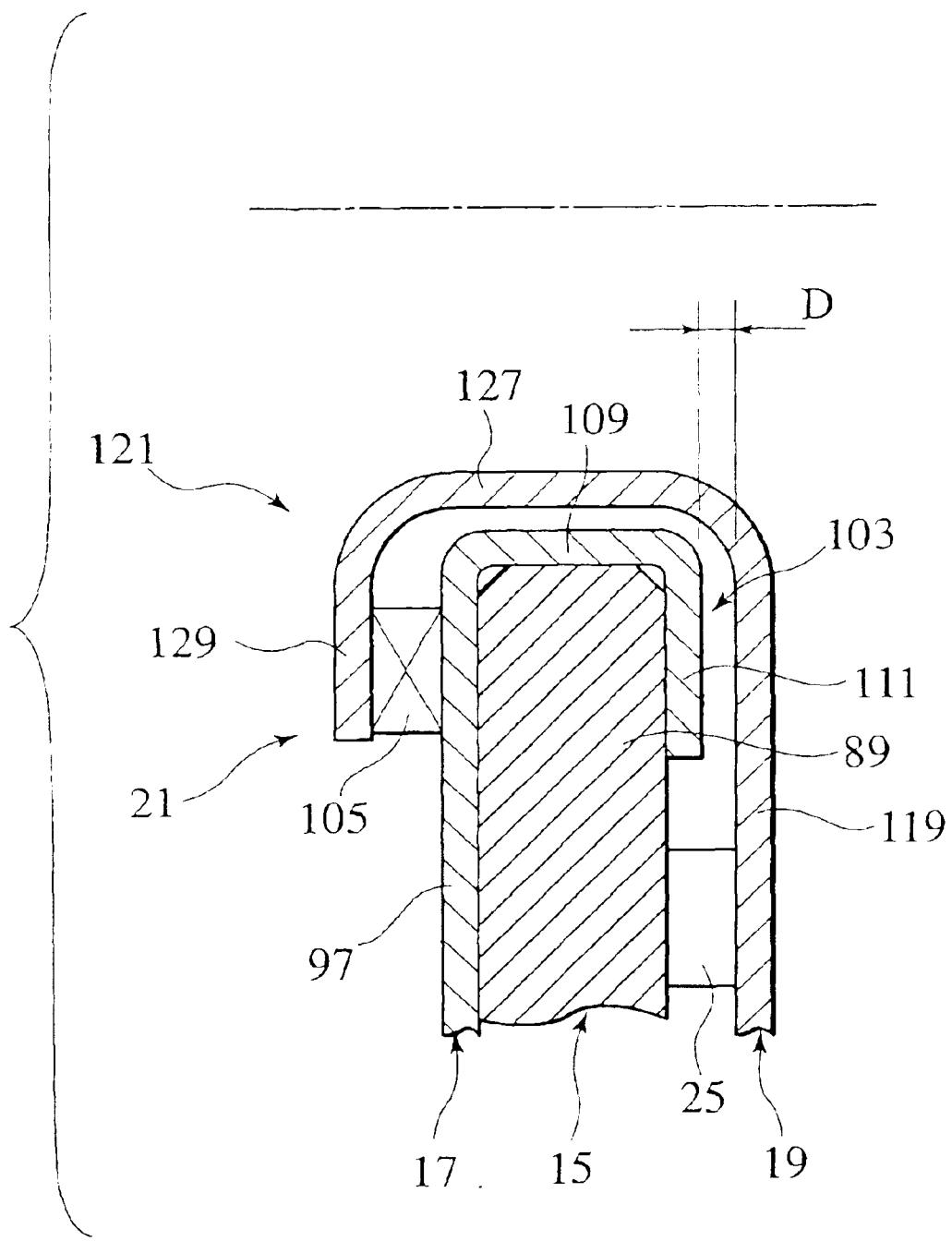
FIG. 8 is a cross sectional view of a main portion in the actuator according to the first embodiment of the present invention, and shows a fitting state between the plates.

The cam plate 17 is press-formed, and is constituted, as shown in FIG. 8, by an annular plate portion 97, a plate portion 99 integrally extended from the annular plate portion 97 and having gear teeth, three assembly recess portions 101 provided in an inner periphery of the annular plate portion 97 at even intervals in a peripheral direction, three support projections 103 (folded portions enwrapping an end portion of the support plate: engagement retaining means) provided in adjacent in a peripheral direction of each of the recess portions 101, three cam pieces 105 provided along an inner periphery of the annular plate portion 97 at even intervals in a peripheral direction, and the like. Three cam pieces 105 mentioned above are formed according to a press-forming, in order to achieve a height in correspondence to a moving amount (stroke) of the movable plate 19 in an axial direction.

The plate portion 99 is integrally formed with the annular plate portion 97, and an outer periphery thereof is formed to be a gear 107 (a gear portion). Further, the support projection 103 is constituted by an axial portion 109 formed in the annular plate portion 97, and a diametrical portion 111 formed in an end portion of the axial portion 109.

Figure 5:
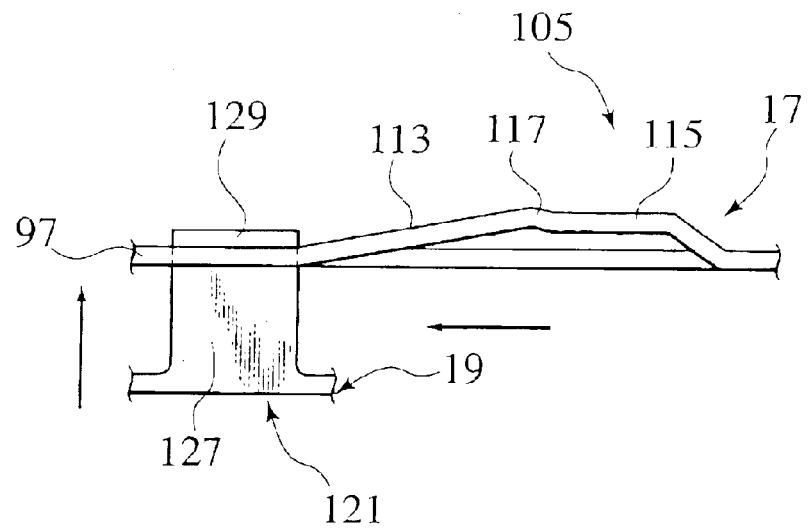
FIG. 5 is a view of the actuator according to the first embodiment of the present invention near a cam mechanism, and shows a state where the movable plate exists in the first side.
Figure 7:
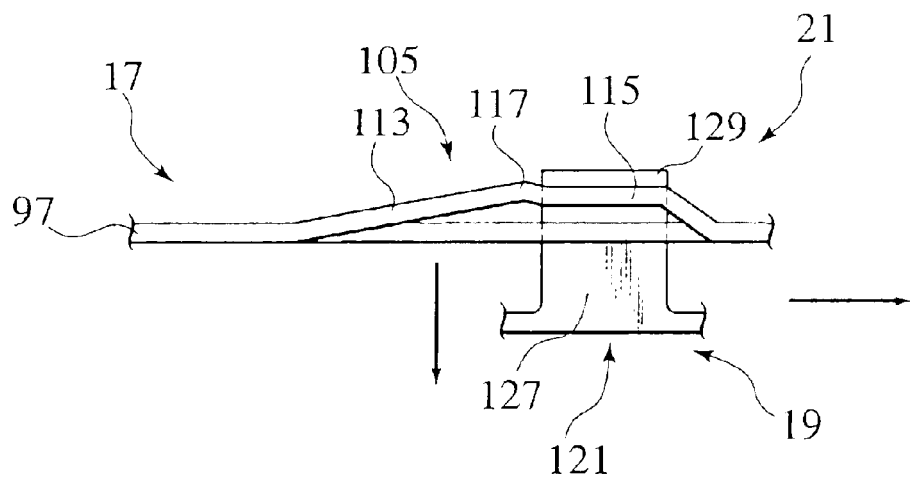
FIG. 7 is a view of the actuator according to the first embodiment of the present invention near the cam mechanism, and shows a state where the movable plate exists in the second side.

Each of the cam pieces 105 is constituted, as shown in FIGS. 5 and 7, by an inclined surface 113 (a cam surface), a hold surface 115 formed in a diametrical direction and having no cam angle, and a hold projection 117 formed between the inclined surface 113 and the hold surface 115.

The movable plate 19 is press-formed, and is constituted, as shown in FIG. 2, by an annular plate portion 119 (a base portion), three cam guide pieces 121 (projections) provided in an inner periphery of the annular plate portion 119 at even intervals in a peripheral direction, three inner peripheral guide pieces 123 provided between the respective cam guide pieces 121, two outer peripheral guide pieces 125 provided in an outer periphery of the annular plate portion 119 at even intervals in a peripheral direction, and the like.

Further, each of the cam guide pieces 121 is constituted by an axial portion 127 formed in the annular plate portion 119, and a diametrical portion 129 formed in an end portion of the axial portion 127.

Figure 3:
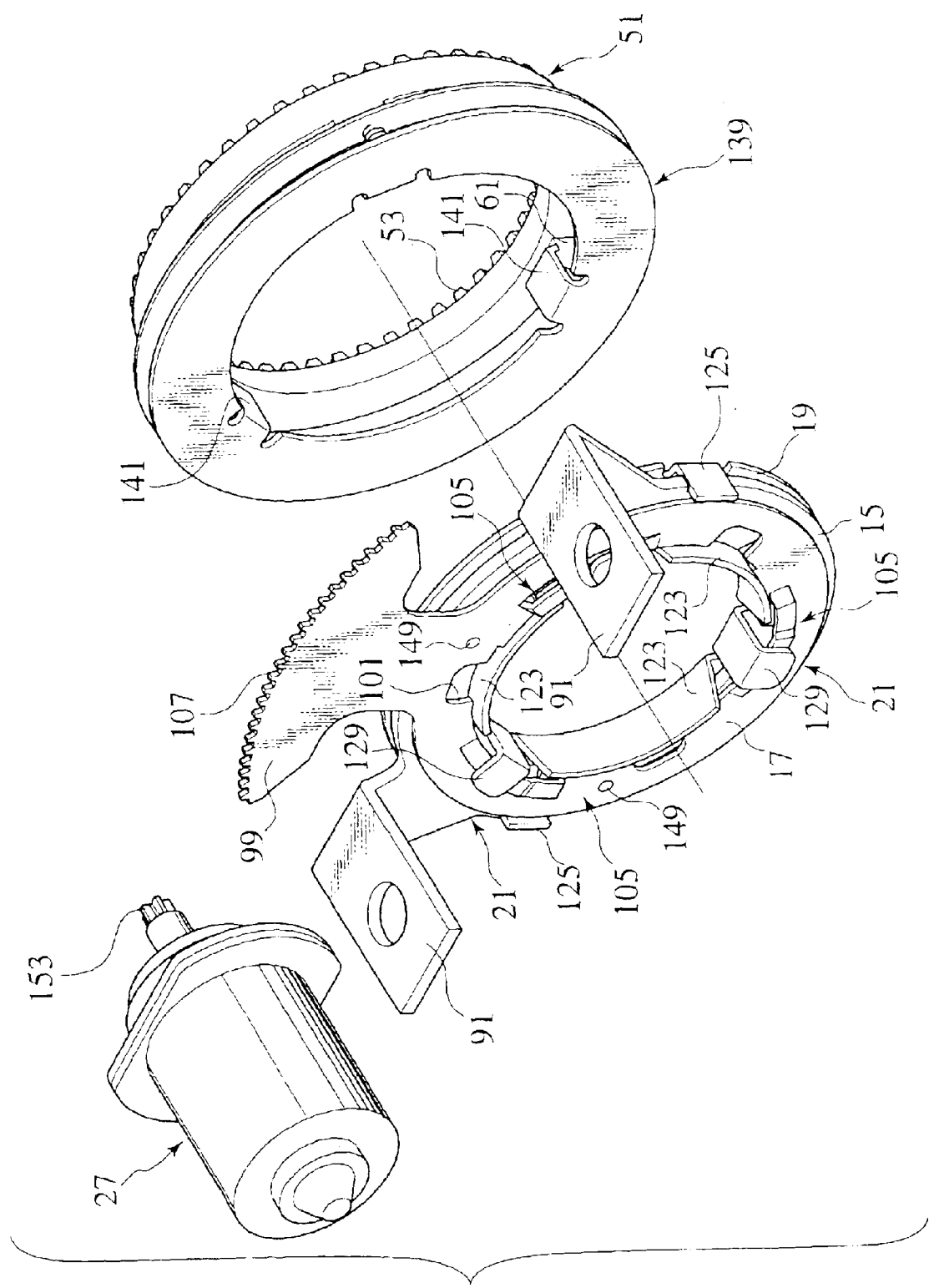
FIG. 3 is a perspective view of the actuator according to the first embodiment of the present invention, and shows a partly assembled state.

The support plate 15, the cam plate 17 and the movable plate 19 are assembled as shown in FIG. 3, and the assembly is carried out according to the following order.

First, the support projections 103 of the cam plate 17 are respectively inserted to the assembly recess portions 93 in the support plate 15 from the right, and thereafter the cam plate 17 is rotated in a direction of an arrow 131 in FIG. 2 until the assembly recess portions 101 in the cam plate 17 lap over the assembly recess portion 93 in the support plate 15.

In this state, as shown in FIG. 8, the axial portions 109 and the diametrical portions 111 of the respective support projections 103 in the cam plate 17 surround an inner peripheral end portion of the annular plate portion 89 in the support plate 15 so as to engage therewith. The cam plate 17 is positioned in an axial direction by the support plate 15, and centered.

Next, when rotating the cam plate 17 in a direction of an arrow 133 in FIG. 2 after inserting the respective cam guide pieces 121 in the movable plate 19 to the respective assembly recess portions 93 and 101 in the support plate 15 and the cam plate 17 from a left side, the movable plate 19 is engaged with the annular plate portion 97 in the cam plate 17 by the diametrical portions 129 of the respective cam guide pieces 121.

As mentioned above, a small number of steps are required for assembling the respective plates 15, 17 and 19, and it is extremely easy to assemble the respective plates 15, 17 and 19.

In a state where the assembly is finished, the respective annular plate portions 89 and 97 in the support plate 15 and the cam plate 17 are guided along the inner periphery by the inner peripheral guide piece 123 in the movable plate 19, whereby the support plate 15, the cam plate 17 and the movable plate 19 are mutually centered. Further, the cam plate 17 can rotate with respect to the support plate 15 and the movable plate 19.

Each of the fixed plate portions 91 in the support plate 15, as shown in FIG. 1, is fixed to the differential carrier 5 by a bolt 137 together with a mounting metal fitting 135 of the electric motor 27.

Each of the cams 21 is constituted, as shown in FIGS. 5 and 7, by the respective cam pieces 105 in the cam plate 17 and the respective cam guide pieces 121 (the diametrical portions 129) in the movable plate 19.

The return spring 23 is integrally formed in the retainer 139 of the clutch ring 51, as shown in FIG. 1. As shown in FIGS. 1, 2 and 3, an arm portion 141 formed in the retainer 139 is fixed to each of the leg portions 61 of the clutch ring 51, and a ring 143 is disposed between the retainer 139 (the return spring 23) and a right end portion of the outer differential case 7.

The clutch ring 51 and the retainer 139 can integrally oscillate in an axial direction, and the return spring 23 energizes the clutch ring 51 in a direction of canceling the engagement of the dog clutch (rightward).

The shift spring 25 is integrally formed with the movable plate 19 as shown in FIG. 1. An energizing force of the shift spring 25 is set larger than an energizing force of the return spring 23, thereby energizing the movable plate 19 and the clutch ring 51 in a direction of engagement of the dog clutch 13 (leftward).

In this case, the return spring 23 and the shift spring 25 may respectively employ a coil spring 145 and a coil spring 147 as shown in FIG. 2.

Further, three spring seats 149 for the coil spring 147 are provided in the cam plate 17 at even intervals in a peripheral direction.

The electric motor 27 is fixed to the differential carrier 5 via the mounting metal fitting 135. The electric motor 27 can rotate in two directions, and is connected to an in-vehicle battery via a controller.

The gear set 29 is constituted by a pinion gear 153 fixed to an output shaft 151 of the electric motor 27, and a gear 107 of the cam plate 17 (the plate portion 99), amplifies a rotation torque of the electric motor 27, and rotates the cam plate 17.

The controller executes an engagement and disengagement operation of the dog clutch 13 in the following manner, simultaneously connects the dog clutch 13 and the 2–4 switching mechanism at a time of switching from the two-wheel drive state to the four-wheel drive state, and simultaneously disconnect the dog clutch 13 and the 2–4 switching mechanism at a time of switching from the four-wheel drive state to the two-wheel drive state.

Further, at a time of executing the engagement and disengagement operation of the dog clutch 13, the controller executes a time control of rotating the electric motor 27 in two directions (in one direction and the opposite direction) for a predetermined time (angle). When the electric motor 27 rotates for the predetermined time, the cam plate 17 is rotated in a predetermined direction by a predetermined angle via the gear set 29.

Figure 4:
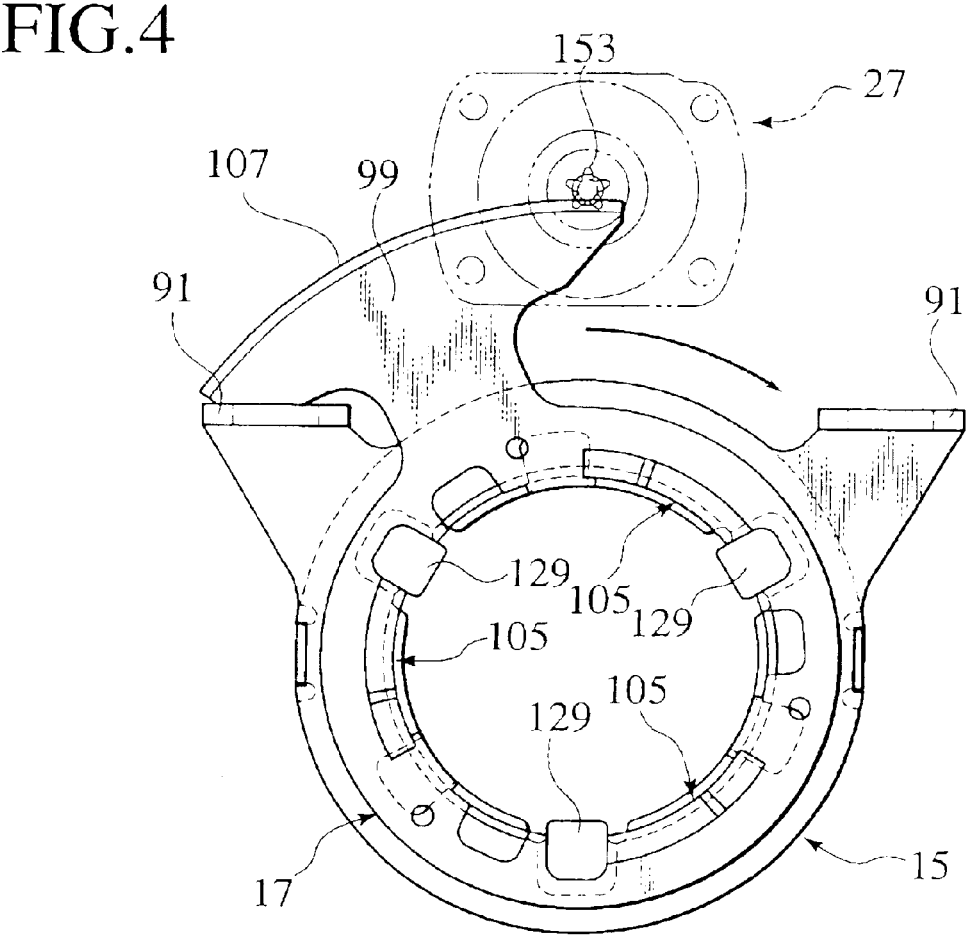
FIG. 4 is a front elevational view of the actuator according to the first embodiment of the present invention, and shows a state where a movable plate exists in a first side.

FIG. 4 shows a state where the plate portion 99 is rotated in one direction by a maximum angle. In this state, the pinion gear 153 of the gear set 29 is engaged with an one end portion of the gear 107. At this time, one fixed plate portion 91 of the support plate 15 strikes the plate portion 99 so as to form a stopper, thereby preventing the cam plate 17 from excessively rotating and preventing the gear 107 from getting out of the pinion gear 153.

FIG. 5 shows a state of the cam 21 in correspondence to FIG. 4. In this state, the diametrical portion 129 of each of the cam guide pieces 121 (the movable plate 19) has not yet ascended the inclined surface 113 of each of the cam pieces 105 (the cam plate 17). At this time, the diametrical portion 129 is pressed against the annular plate portion 97 by an energizing force of the shift spring 25, and the cams 21 is not operated. Further, respective arrows in FIGS. 4 and 5 show moving directions of the cam plate 17 and the cam guide piece 121 (the movable plate 19) at a time of rotating the electric motor 27 in an opposite direction from the illustrated state.

Under a state where the cams 21 are not operated, the movable plate 19 (the clutch ring 51) moves to a left side by the shift spring 25 as shown in a lower half portion in FIG. 1, and the dog clutch 13 is engaged.

At this time, the shift spring 25 constitutes a waiting mechanism, and engages the dog clutch 13 in the case where phases of the mating gears 53 and 55 are aligned.

When the dog clutch 13 is engaged, the vehicle 4 becomes the four-wheel drive state as mentioned above.

Figure 6:
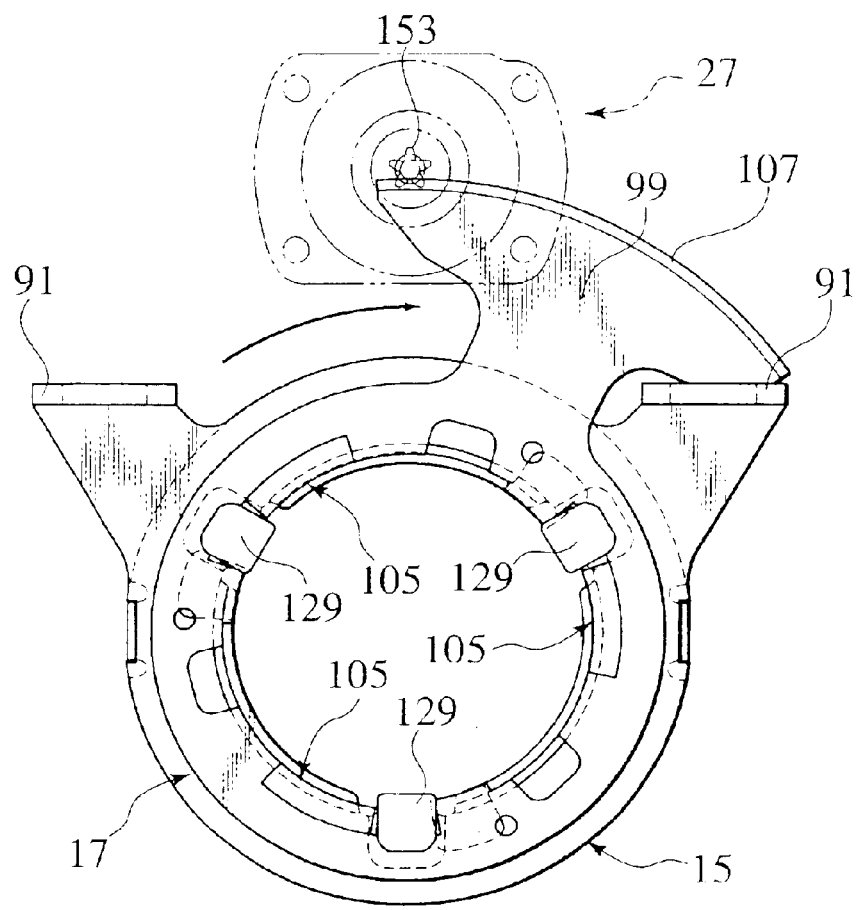
FIG. 6 is a front elevational view of the actuator according to the first embodiment of the present invention, and shows a state where the movable plate exists in a second side.

FIG. 6 shows a state where the electric motor 27 is rotated at the maximum angle in an opposite direction from the state in FIG. 4. The pinion gear 153 of the gear set 29 is engaged in another end portion of the gear 107. At this time, another fixed plate portion 91 of the support plate 15 strikes the plate portion 99 so as to form a stopper, thereby preventing the cam plate 17 from excessively rotating and preventing the gear 107 from getting out of the pinion gear 153.

FIG. 7 shows a state of the cam 21 in correspondence to FIG. 6. In this state, the diametrical portion 129 of each of the cam guide pieces 121 ascends the inclined surface 113 of each of the cam pieces 105, gets over the hold projection 117 so as to be held by the hold surface 115, and actuates the cams 21. Further, respective arrows in FIGS. 6 and 7 show moving directions of the cam plate 17 and the cam guide piece 121 (the movable plate 19) at a time of rotating the electric motor 27 in an opposite direction from the illustrated state.

When the cams 21 are operated, each of the cam guide pieces 121 (the movable plate 19) moves to the above in FIG. 7 by means of the cam thrust force, and compresses the shift spring 25.

In this case, FIG. 8 shows axial positions of the respective plates 15, 17 and 19 at this time. A sufficient clearance D is kept between the movable plate 19 (the annular plate portion 119) and the diametrical portion 111 of the cam plate 17, even in a state where the shift spring 25 is compressed.

When the shift spring 25 is brought into contact with the support plate 15 mentioned above, and is contracted due to an application of the axial force, as shown in an upper half portion in FIG. 1, the movable plate 19 (the clutch ring 51) moves to the right side due to the energizing force of the return spring 23, and the engagement of the dog clutch 13 is cancelled.

When the engagement of the dog clutch 13 is canceled, the vehicle becomes in the two-wheel drive state as mentioned above.

Further, since the hold projections 117 hold the respective cam guide pieces 121 on the hold surfaces 115 by means of a check function thereof, the vehicle is prevented from fluctuating to the four-wheel drive state from the two-wheel drive state against the driver's will, even in the case where disturbance factors such as a vibration, an impact and the like are applied to the vehicle during traveling, under a state where the electric motor 27 is stopped.

As mentioned above, in the four-wheel drive state where the dog clutch 13 and the 2–4 switching mechanism are respectively connected, the drive force of the engine is transmitted to the outer differential case 7 from the 2–4 switching mechanism via the rear wheel power transmission system, and the inner differential case 9 is rotated via the dog clutch 13. The rotation is distributed to the side gears 69 and 71 from the pinion shaft 65 via the pinion gear 67, and is transmitted to the left and right rear wheels via the respective axles.

When the vehicle becomes in the four-wheel drive state, a traveling property, an escaping property and a stability on a punishing road or the like are improved.

Further, for example, when a difference of drive resistance between the rear wheels occurs during traveling on the punishing road, the drive force of the engine is differentially distributed to the right and left rear wheels according to an autorotation of each of the pinion gears 67.

In the two-wheel drive state where the connections of the dog clutch 13 and the 2–4 switching mechanism are respectively cancelled, an area from the inner differential case 9 to the rear wheels is disconnected by the dog clutch 13, and these elements become in a free rotation state. Further, the power transmission system from the 2–4 switching mechanism to the outer differential case 7 is disconnected from both of the drive force of the engine and the interlocking rotation by the rear wheels, and the rotation is stopped.

In the two-wheel drive state where the rotation of the rear wheel power transmission system from the 2–4 switching mechanism to the outer differential case 7 is stopped, an abrasion is reduced in the various portions of the rear side power transmission system and a durability is improved, as well as the vibration is reduced and a ride quality is improved. Further, an engine load is reduced to the amount of reduction in the rotation resistance, and a specific fuel consumption is improved.

In the outer differential case 7, there are formed spiral oil grooves 163 and 165 respectively on inner peripheries of the boss portions 31 and 33 in addition to the openings 57 and 59. Further, in portions opposing to the thrust washers 85 and 85, there are formed diametrical oil grooves 167 and 169 respectively communicated with the oil grooves 163 and 165.

Since the openings 57 and 59 are formed in an outer side portion of the outer differential case 7 in a diametrical direction, the openings 57 and 59 are always dipped into the oil in the oil reservoir formed in the differential carrier 5, and the oil flows in and out through the openings 57 and 59 in correspondence to the rotation of the outer differential case 7.

Further, the oil in the oil reservoir is swept up by the rotation of the outer differential case 7 (the ring gear 43), and the swept-up oil is accelerated movement by a screw pump effect of the oil grooves 163 and 165, and flows in the inner portion of the outer differential case 7 through the oil grooves 167 and 169 and gaps of the thrust washers 85 and 85 and the like.

The oil flowing in the outer differential case 7 is supplied to the mating portions of the respective gears 67, 69 and 71 constituting the differential mechanism 11, the sliding portion between the pinion shafts 65 and the pinion gears 67, the sliding portion between the outer differential case 7 and the inner differential case 9, the sliding portion between the outer differential case 7 and the clutch ring 51, the dog clutch 13 (the mating gears 53 and 55), and the like so as to lubricate and cool these elements.

Further, the lower portion of the actuator 1 is dipped into the oil reservoir, and the sliding portions between the rotated cam plate 17, and the support plate 15 and the movable plate 19, the cams 21 and the like are lubricated and cooled.

Further, the gear set 29 is lubricated and cooled by the swept oil mentioned above.

In each of the lubricated and cooled portions mentioned above, the abrasion is reduced by the supplied oil, whereby the durability is improved. Further, a friction resistance is reduced in each of the sliding portions, and the specific fuel consumption is improved.

The actuator 1 and the rear differential 3 are structured in the manner mentioned above.

In the actuator 1, as shown in FIG. 2, the support plate 15 and the cam plate 17 are positioned in the axial direction and centered by the support projection 103 provided in the cam plate 17.

Accordingly, even when ratcheting movement is generated in the dog clutch 13 during the period that the cams 21 are not operated, the cam plate 17 is prevented from oscillating, the stable mating can be achieved between the gear 107 of the cam plate 17 and the pinion gear 153 of the electric motor 27, the abrasion and durability reduction are prevented, and the actuator 1 and the rear differential 3 become stable in the operation and the performance.

Further, since the ratcheting movement of the dog clutch 13 becomes light by preventing the oscillation of the cam plate 17, it is possible to widely reduce the reduction in durability generated in the mating gears 53 and 55 of the dog clutch 13, and the return spring 23 and the shift spring 25 expanded and contracted in correspondence to the ratcheting movement.

Further, the actuator 1 converting the rotation torque of the electric motor 27 into the operating force of the dog clutch 13 by the cams 21 does not require the expensive pump, the piston and cylinder, the shift mechanism and the like differently from the prior art employing the fluid pressure type actuator. Accordingly, it is possible to reduce the number of the parts to the amount thereof, make the structure simple and achieve a low cost.

Further, the rear differential 3 employing the actuator 1 does not require a wide arrangement space for the pressure lines and the like, is structured light and compact, is improved in an in-vehicle property, is not required to be changed in the differential carrier 5, and is prevented a cost increase in correspondence to the change.

Further, the actuator 1 and the rear differential 3 are free from a reduction in function and an influence of pressure fluctuation caused by the pressure leakage, and are widely improved in the performance, the stability and the reliability. Further, it is avoidable that the pressure lines are reinforced in seal in each of the portions, and a cost increase is generated in correspondence thereto.

Figure 9:
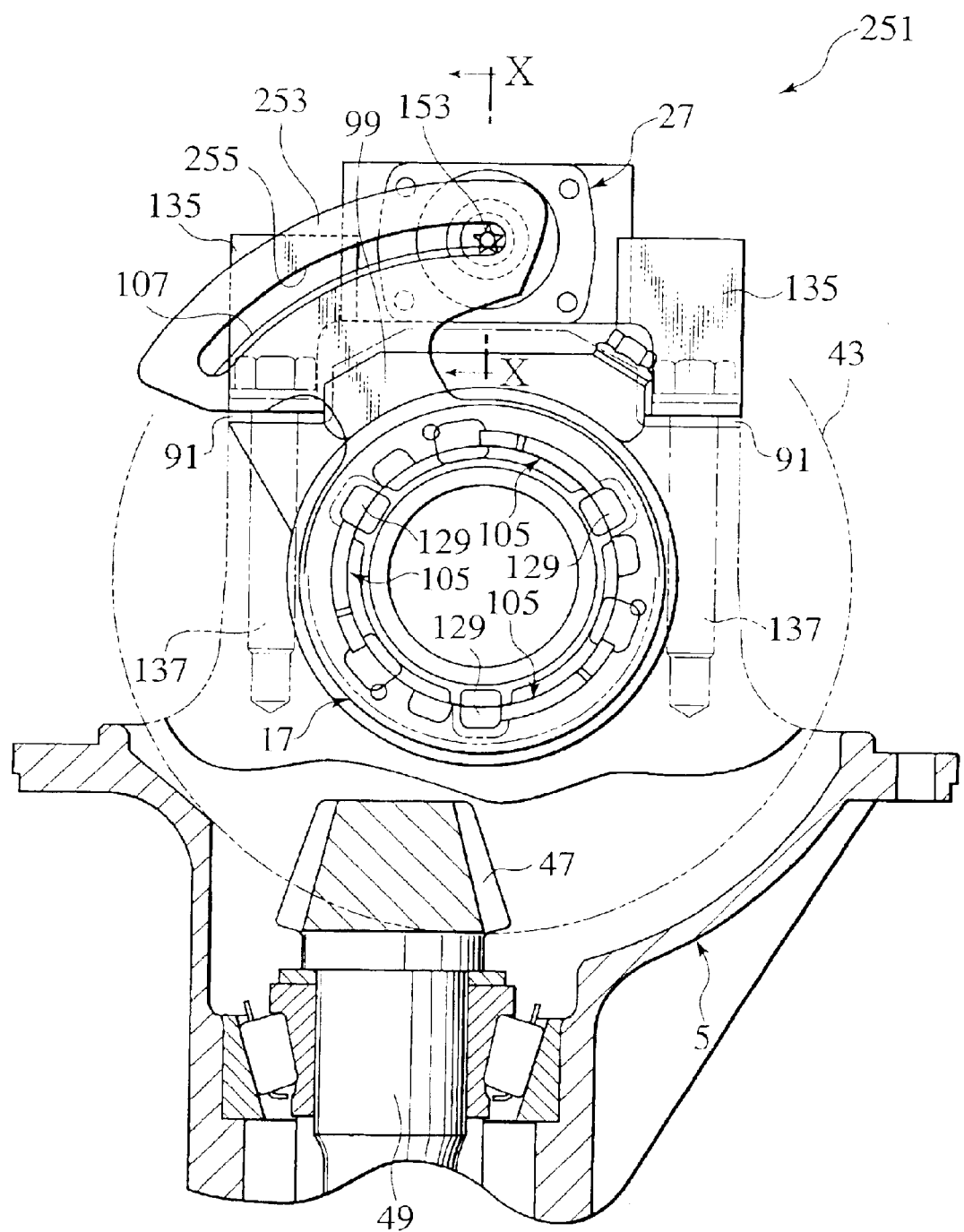
FIG. 9 is a front elevational view of an actuator according to a second embodiment of the present invention.
Figure 10:
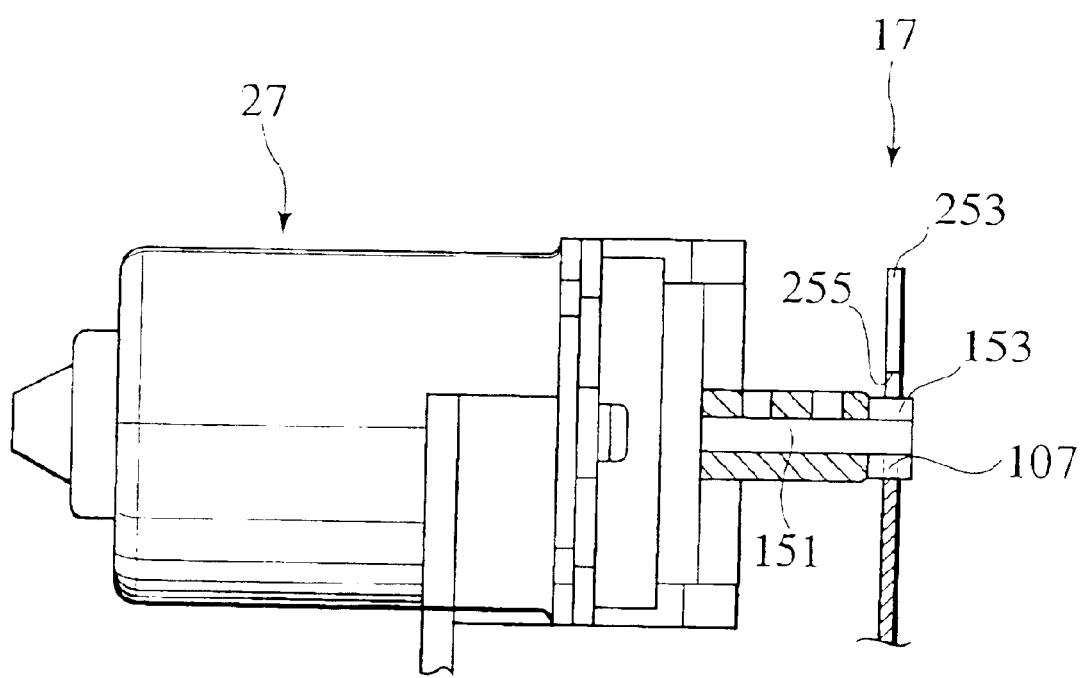
FIG. 10 is a partly cross sectional view of the actuator according to the second embodiment of the present invention along a line X—X shown in FIG. 9.

A description will be given below of a second embodiment according to the present invention with reference to FIGS. 9 and 10. In the following description, the same reference numerals are attached to substantially the same elements as those mentioned above, and a detailed description is omitted. A description will be mainly given of differences.

An actuator 251 is employed in the rear difference 3 according to the first embodiment in place of the actuator 1.

The actuator 251 is provided in the cam plate 17 (the plate portion 99) with a guide portion 253 (mating retaining means) surrounding both end sides and a back surface side of the gear 107 while spacing a predetermined interval between the cam plate 17 and the gear 107. The pinion gear 153 close to the electric motor 27 is engaged with the gear 107 in a slit 255 provided between the guide portion 253 and the gear 107.

In the actuator 251 structured in the manner mentioned above, the cam plate 17 (the gear 107) rotates according to the rotation of the pinion gear 153. Even in the case where the pinion gear 153 moves to an end portion of the gear 107, the pinion gear 153 strikes both end portions of the guide portion 253, thereby being prevented from getting out of the gear 107 owing to a guide function.

Further, since the mating reaction force applied to the pinion gear 153 generated by the mating with the gear 107 is born by the guide portion 253, it is possible to prevent the pinion gear 153, the output shaft 151 of the electric motor 27 and the like from being deformed.

According to the second embodiment, since the mating between the pinion gear 153 and the gear 107 can be normally kept, the performance and the motion of the actuator 251 and the rear difference 3 are stable.

Figure 11:
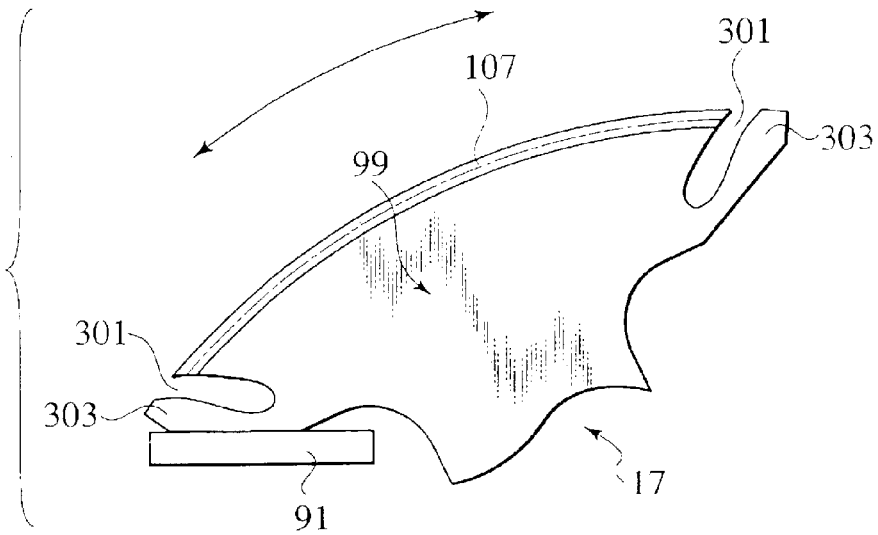
FIG. 11 is a front elevational view of a main portion of a cam plate and a stopper in an actuator according to a third embodiment of the present invention.

A description will be given below of a third embodiment according to the present invention with reference to FIG. 11. In the following description, the same reference numerals are attached to substantially the same elements as those mentioned above, and a detailed description is omitted. A description will be mainly given of differences.

An actuator according to the third embodiment is employed in the rear difference 3 according to the first embodiment in place of the actuator 1.

In the actuator according to the third embodiment, spring pieces 303 (mating retaining means) are formed by forming slits 301 in both ends (portions where the cam plate is brought into contact with the stopper) of the cam plate 17 (the plate portion 99).

Accordingly, even when the cam plate 17 (the gear 107) rotates in two directions by the electric motor 27, and strikes the fixed plate portions 91 (stoppers for keeping an angle of rotation of the cam plate in a predetermined range) of the support plate 15, the impact is absorbed by the spring pieces 303, so that the mating between the pinion gear 153 and the gear 107 does not displace due to the impact application.

Further, the abrasion of the pinion gear 153 and the gear 107 caused by the impact is prevented by the impact absorbing function generated by the spring pieces 303, and it is also possible to prevent the cam plate 17 (the plate portion 99) and the fixed plate portions 91 from being deformed.

According to the third embodiment, since the mating between the pinion gear 153 and the gear 107 is normally kept as mentioned above, the performance and the motion of the actuator and the rear difference 3 are stable.

Further, since the slits 301 of the plate portion 99 can be worked at the same time of press-forming the cam plate 17, this structure can be easily carried out at a low cost.

Figure 12:
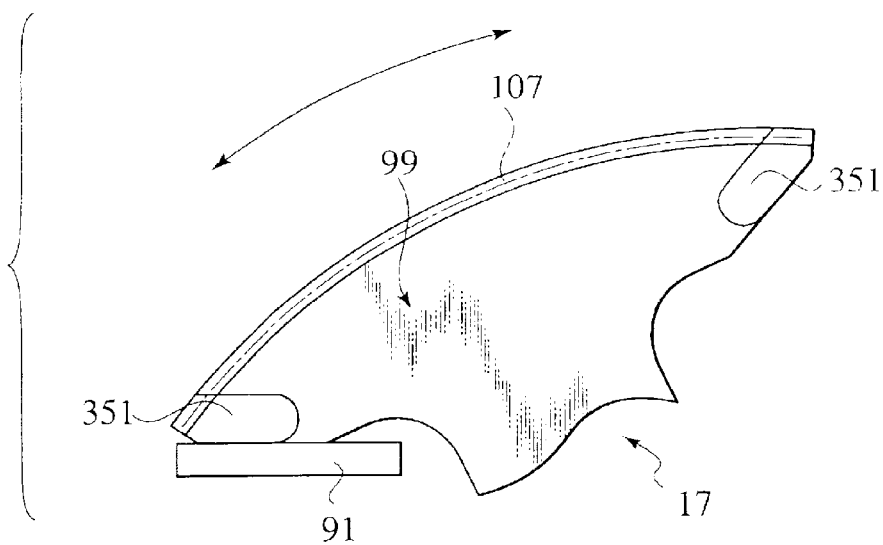
FIG. 12 is a front elevational view of a main portion of a cam plate and a stopper in an actuator according to a fourth embodiment of the present invention.
Figure 13:
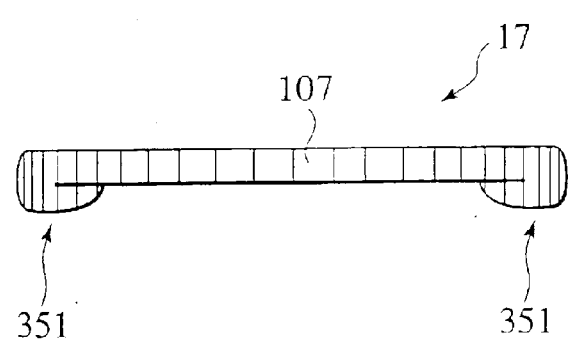
FIG. 13 is a plan view of the cam plate of the actuator according to the fourth embodiment of the present invention, particularly shows a gear portion thereof.

A description will be given below of a fourth embodiment according to the present invention with reference to FIGS. 12 and 13. In the following description, the same reference numerals are attached to substantially the same elements as those mentioned above, and a detailed description is omitted. A description will be mainly given of differences.

An actuator according to the fourth embodiment is employed in the rear difference 3 according to the first embodiment in place of the actuator 1.

In the actuator according to the fourth embodiment, a pair of thick portions 351 (mating retaining means) are provided in both ends of the cam plate 17 (the plate portion 99).

Accordingly, even in the case where the cam plate 17 (the gear 107) rotates in two directions by the electric motor 27 and collides with the fixed plate portions 91 (the stoppers) of the support plate 15, whereby the rotation of the electric motor 27 stalls and a great torque is applied to the gear 107, the thick portions 351 receive the torque, so that a damage and an abrasion can be prevented.

A description will be given below of a fifth embodiment according to the present invention with reference to FIGS. 14 and 19. In the following description, the same reference numerals are attached to substantially the same elements as those mentioned above, and a detailed description is omitted. A description will be mainly given of differences.

An actuator 601 is employed in the rear difference 3 according to the first embodiment in place of the actuator 1.

Figure 14:
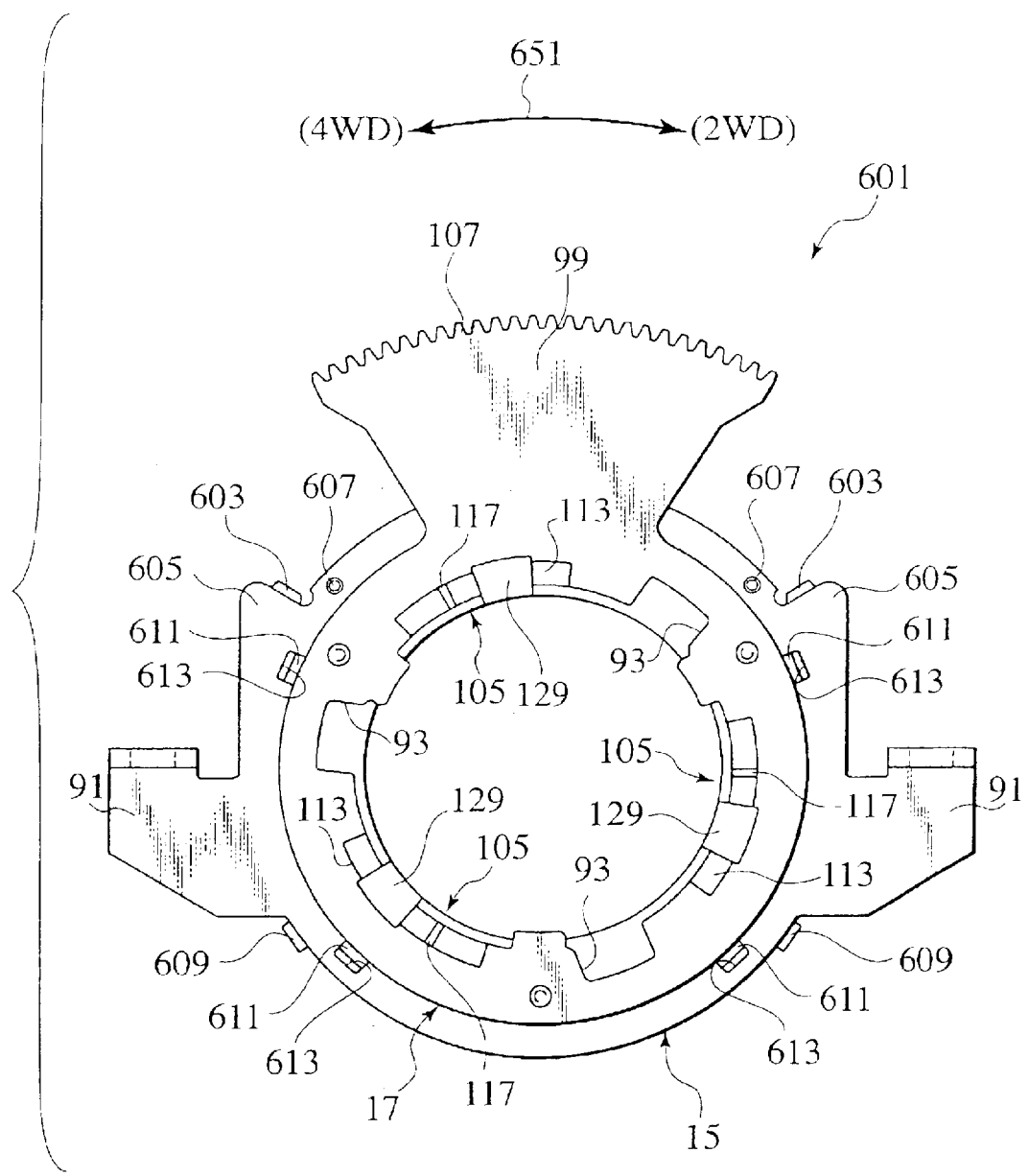
FIG. 14 is a front elevational view of an actuator according to a fifth embodiment of the present invention, and shows a state where a movable plate exists in a center.
Figure 15:
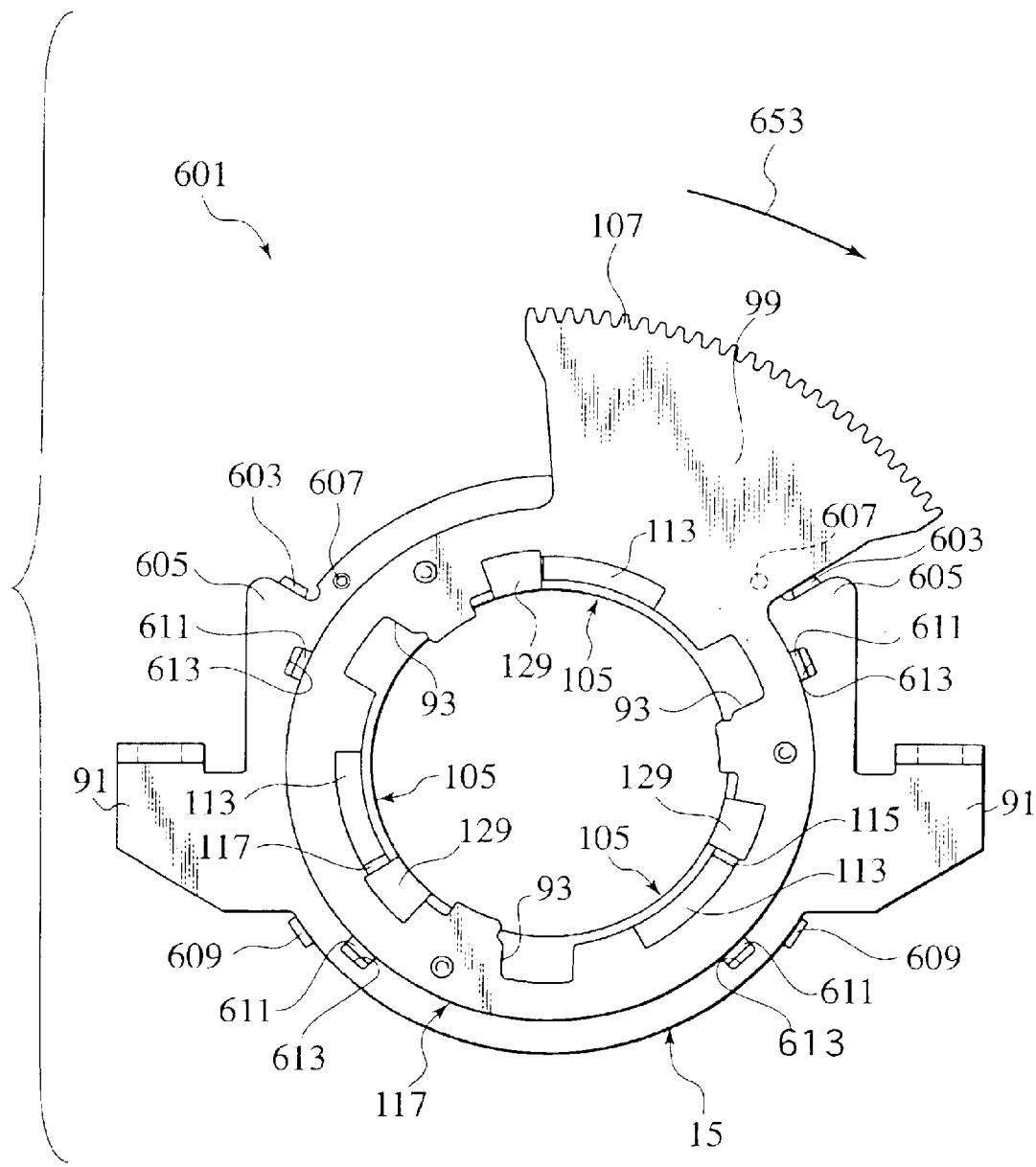
FIG. 15 is a front elevational view of the actuator according to the fifth embodiment of the present invention, and shows a state where the movable plate exists in a first side.

In the actuator 601, as shown in FIGS. 14 and 15, stoppers 603, protruding portions 605 and a pair of convex portions 607 (decelerating means) are formed in the support plate 15, at even intervals in a peripheral direction in both sides of a center of rotation of the cam plate 17 (the plate portion 99).

Each of the stoppers 603 is folded to a side of the cam plate 17 in each of the protruding portions 605. As shown by an arrow 651 in FIG. 14, the cam plate 17 (the plate portion 99) rotating in two directions is brought into contact with any of the stoppers 603 so as to stop rotating, thereby preventing the pinion gear 153 from coming off from the gear portion 107. FIG. 15 shows a state where the cam plate 17 (the plate portion 99) rotates in a right direction (toward a position of the 2WD) as shown by an arrow 653 so as to be brought into contact with any of the stoppers 603.

Further, the stoppers 603 are folded so as to bend in a rotation direction of the cam plate 17, and reduces an impact generated at a time when the rotating cam plate 17 is brought into contact with any of the stoppers 603, by means of a spring force.

Each of the convex portions 607 is provided in a side of the cam plate 17, and is formed in a position of rotation (an angle of rotation) just before the cam plate 17 is brought into contact with any of the stoppers 603.

Figure 16:
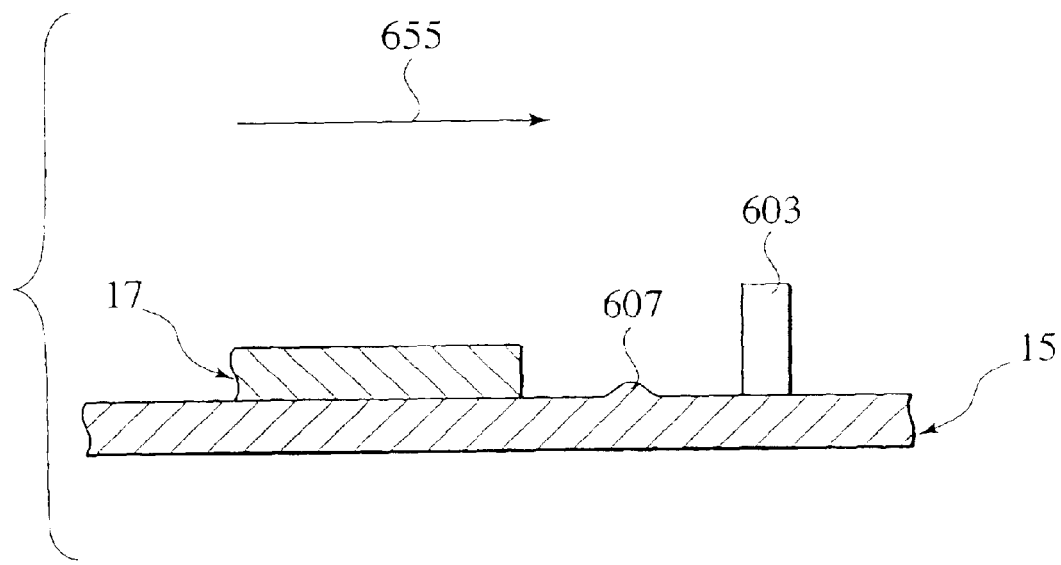
FIG. 16 is a cross sectional view of a main portion of the actuator according to the fifth embodiment of the present invention near a projection.

FIG. 16 shows a state where the cam plate 17 rotates and moves close to the convex portion 607. In this state, the cam plate 17 finishes the contact with the movable plate 19 by means of the cams 21 as mentioned above, and rotates at a high speed by means of the torque of the electric motor 27, as shown by a long arrow 655.

Figure 17:
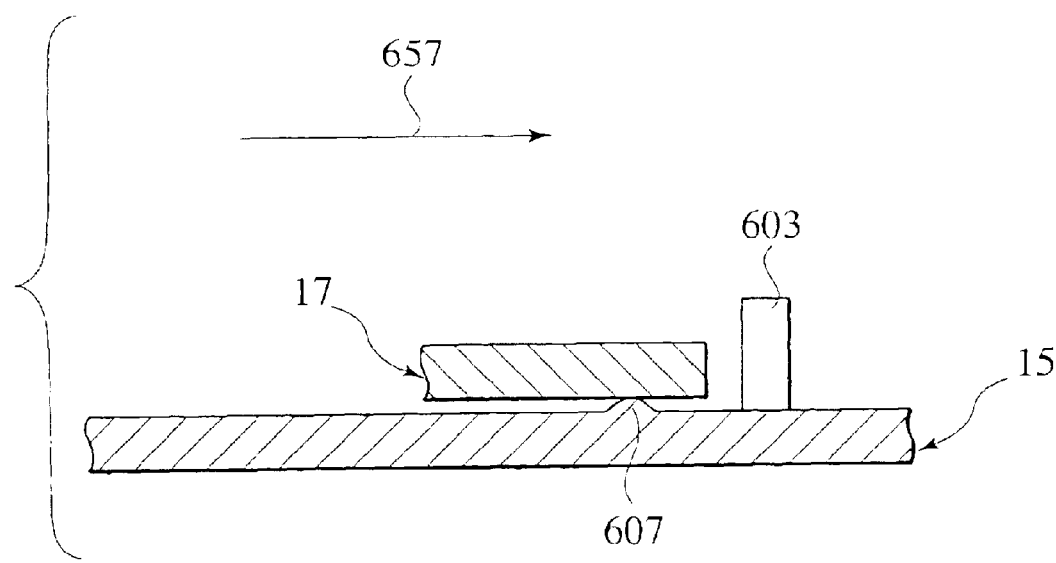
FIG. 17 is a cross sectional view of a main portion of the actuator according to the fifth embodiment of the present invention near the projection, and shows a state where the projection decelerates a cam plate based on a friction.

FIG. 17 shows a state where the cam plate 17 rotating further from the position in FIG. 16 runs over the convex portion 607 so as to be exposed to the sliding resistance. As shown by a short arrow 657, the rotation speed is decelerated just before the cam plate 17 is brought into contact with the stopper 603 due to the sliding resistance.

When the rotation speed is decelerated in the manner mentioned above, the cam plate 17 is inhibited from striking the stopper 603 at a high speed and the impact is reduced. Accordingly, it is possible to prevent the pinion gear 153 of the electric motor 27, the gear portion 107 of the plate portion 99 and the electric motor 27 from being damaged.

Figure 18:
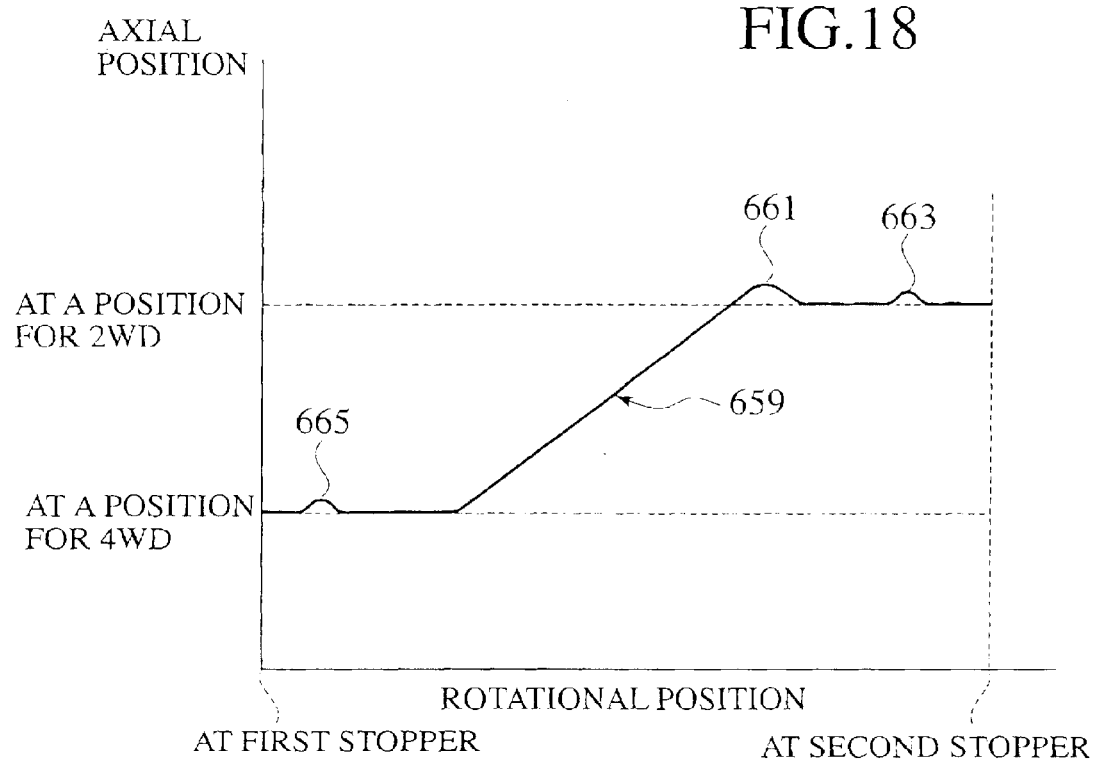
FIG. 18 is a graph showing a relation between a rotational position and an axial position of the cam plate, in the actuator according to the fifth embodiment of the present invention.

FIG. 18 is a graph 659 showing an axial position of the movable plate 19 with respect to the angle of rotation of the cam plate 17, in which a stopper position is displaced in a horizontal axis (angle of rotation), and a position at the two-wheel drive (2WD) time and a position at the four-wheel drive (4WD) are displaced in a vertical axis (axial position).

When the cam plate 17 rotates from the state in FIG. 14 to the direction at the two-wheel drive time (the position in FIG. 15), the cams 21 are operated, and the movable plate 19 climbs up the inclined surface 113 of the cam piece 105 as shown in the graph 659, and moves to the position at the two-wheel drive time via a peak 661 by the hold projection 117.

During this time, the cam plate 17 is brought into contact with any of the convex portions 607 so as to be decelerated, and is thereafter brought into contact with any of the stoppers 603 so as to stop rotating. Further, the movable plate 19 moves in an axial direction as shown by a peak 663 to the amount of the axial moving distance at a time when the cam plate 17 runs over any of the convex portions 607, after passing through a peak 661.

Further, when the cam plate 17 rotates in a direction at the four-wheel drive time from the state in FIG. 14, the operation of the cams 21 is stopped, and the movable plate 19 goes down along the inclined surface 113 of the cam piece 105 so as to move to the position at the four-wheel drive time.

During this time, the cam plate 17 is brought into contact with the opposite convex portion 607, and is thereafter brought into contact with the opposite stopper 603 so as to stop rotating. Further, the movable plate 19 moves in an axial direction as shown by a peak 665 to the amount of the axial moving distance at a time when the cam plate 17 runs over the convex portion 607.

Figure 19:
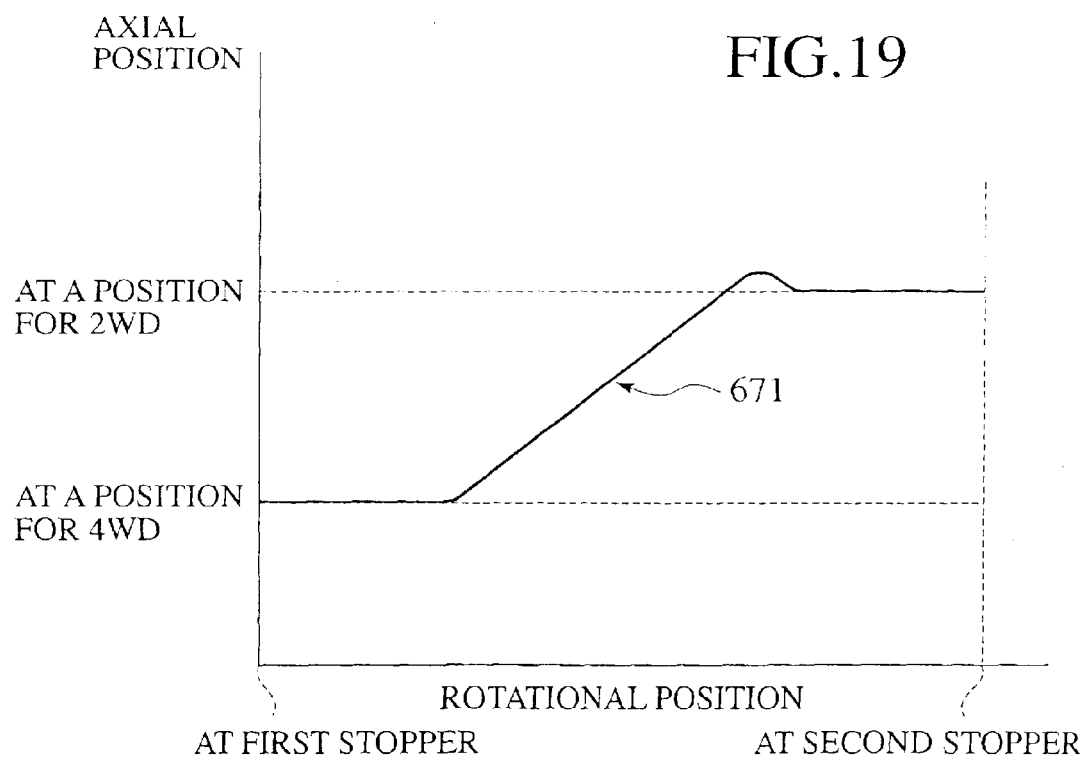
FIG. 19 is a graph showing a relation between a rotational position and an axial position of the cam plate, in the case where the projection is not provided for the purpose of comparing with FIG. 18.

Further, FIG. 19 is a graph 671 showing an axial position of the movable plate with respect to the angle of rotation of the cam plate, in the actuator having no convex portions 607 and 607, and shows the fact that the peaks 663 and 665 at a time when the cam plate 17 runs over the convex portion 607, do not exist, and the decelerating function and the impact reducing function of the cam plate 17 do not exist.

In the case of the actuator 601, the fixed plate portion 91 of the support plate 15 gets relief from the stopper function, by arranging the stoppers 603.

Further, as shown in FIGS. 14 and 15, the movable plate 19 is provided with two outer peripheral guide pieces 609 and four guide pieces 611. Each of the outer peripheral guide pieces 609 holds the outer periphery of the support plate 15 so as to center the movable plate 19 and the support plate 15 with each other. Each of the guide pieces 611 is engaged with a guide hole 613 provided in the support plate 15, and prevent and center the elements with each other.

In the actuator 601 structured in this manner, since the rotation of the cam plate 17 is decelerated by the sliding with the convex portion 607 as mentioned above, the impact generated at a time of being brought into contact with any of the stoppers 603 is reduced, the pinion gear 153, the gear portion 107 and the electric motor 27 are prevented from being damaged, and the durability is improved.

Further, the structure in which the convex portions 607 are formed in the support plate 15 is carried out easily at a low cost.

A description will be given below of a sixth embodiment according to the present invention with reference to FIGS. 20 to 27. In the following description, right and left directions coincide with right and left directions in a four-wheel drive vehicle in which a rear differential 703 is employed. The rear differential 703 (a differential apparatus distributing a drive force of an engine to right and left rear wheels) is a differential unit provided with a differential mechanism, an input side of which has an intermissive function of the drive force transmission. The rear differential 703 is employed in the four-wheel drive vehicle and disconnects the drive force to the rear wheels at the two-wheel drive time.

A power transmission system of the four-wheel drive vehicle in which the rear differential 703 is employed is constituted by an engine (a motor), a transmission, a transfer, a 2–4 switching mechanism, a front differential (a differential unit for distributing the drive force of the engine to right and left front wheels), a front axle, right and left front wheels, a propeller shaft of rear wheels, the rear differential 703, a rear axle, right and left rear wheels and the like.

The 2–4 switching mechanism constitutes a rear wheel output interface of the transfer, is disconnected and connected at the same time of the rear differential 703 in the following manner, and intermits the drive force to the rear wheels. The drive force of the engine is transmitted to the transfer from the transmission, and is distributed from the transfer to the front wheels and the rear wheels.

The drive force distributed to the front wheels is distributed to the right and left wheels from the front differential via the front axle. Further, the drive force distributed to the rear wheels is transmitted to the rear differential 703 from the 2–4 switching mechanism and the rear wheel propeller shaft during the connection of the 2–4 switching mechanism and the rear differential 703, and is distributed to the right and left rear wheels from the rear differential 703 via the rear axle, whereby the vehicle becomes under the four-wheel drive state. Further, when canceling the connection of the 2–4 switching mechanism and the rear differential 703, respectively, the rear wheels are detached from the engine and the vehicle becomes under the two-wheel drive state.

The rear differential 703 is disposed in an inner portion of a differential carrier 705, and an oil reservoir is formed in an inner portion of the differential carrier 705. The rear differential 703 is constituted, as shown in FIG. 20, by an actuator 701 employing a plate having a gear teeth, an outer differential case 707, an inner differential case 709, a bevel gear type differential mechanism 711, a dog clutch 713 (a device object to an operation: a clutch), and the like.

Figure 20:
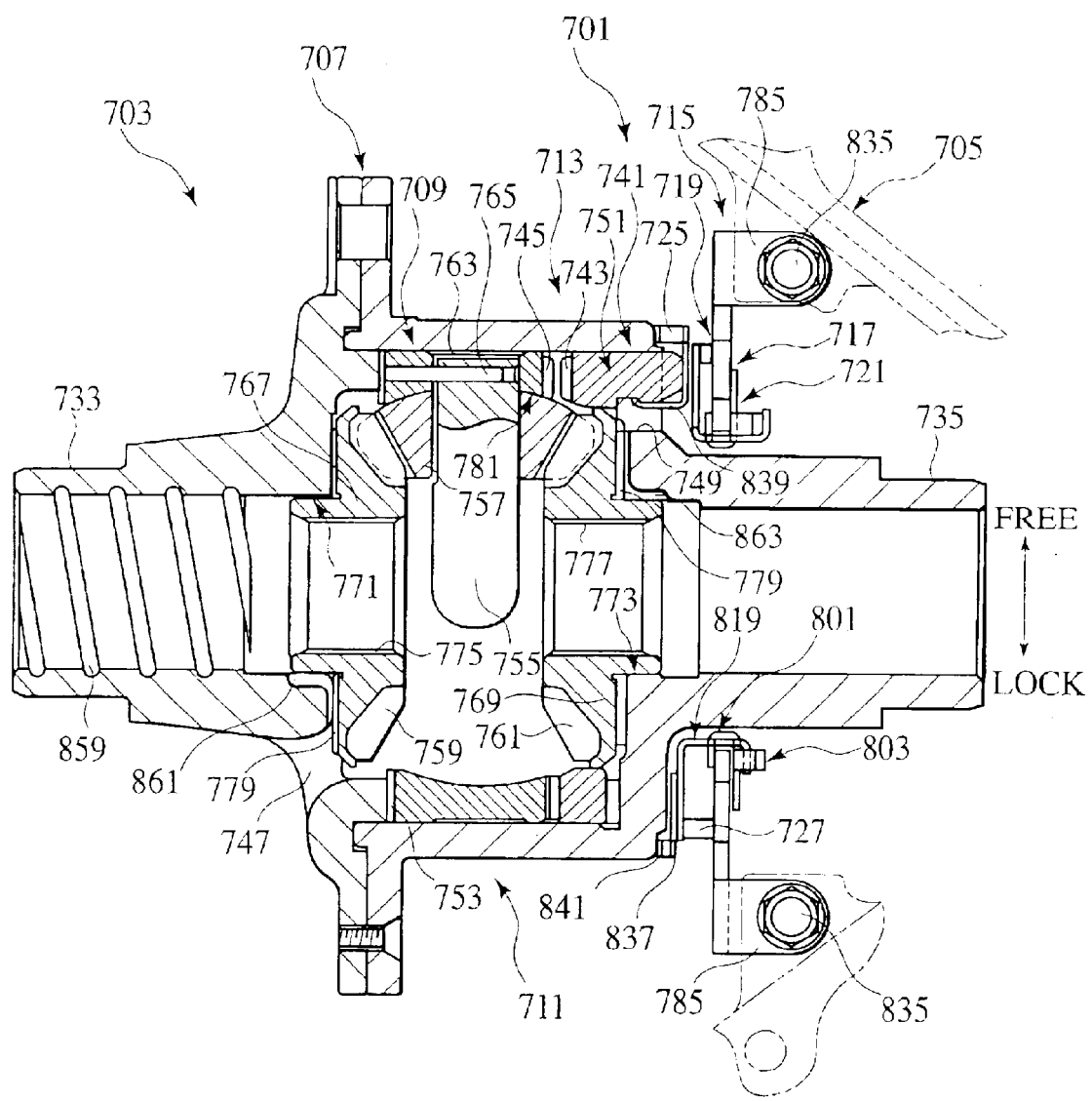
FIG. 20 is a cross sectional view of an actuator and a power transmission device according to a sixth embodiment of the present invention.
Figure 21:
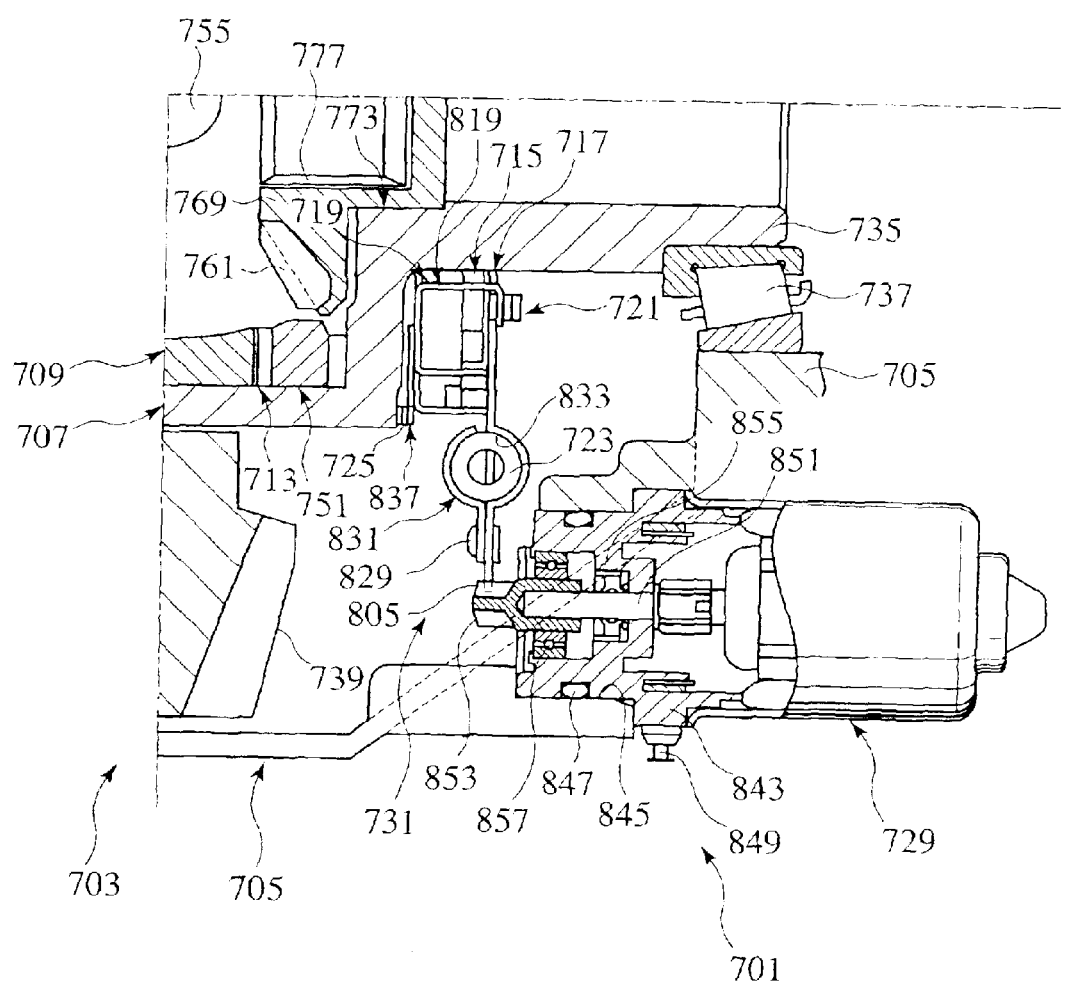
FIG. 21 is a cross sectional view of a main portion of the actuator according to the sixth embodiment of the present invention.

The actuator 701 employing the plate having the gear teeth is constituted, as shown in FIGS. 20 and 21, by a support plate 715, a cam plate 717, a movable plate 719, cams 721 (a cam mechanism), a coil spring 723 (an impact force absorbing means), a return spring 725, a shift spring 727, an electric motor 729, a gear set 731, a controller and the like.

The rear differential 703 is formed as a double casing structure comprising the outer differential case 707 and the inner differential case 709, and the inner differential case 709 is supported so as to freely slidably rotate in an inner periphery of the outer differential case 707. Further, left and right boss portions 733 and 735 formed in the outer differential case 707 are respectively supported to the differential carrier 705 via thrust bearings 737 (see FIG. 21).

A ring gear 739 (see FIG. 21) is fixed to the outer differential case 707 by a bolt. The ring gear 739 is engaged with a drive pinion gear, and the drive pinion gear is integrally formed with a drive pinion shaft. The drive pinion shaft is connected to the 2–4 switching mechanism of the transfer via a joint, a propeller shaft of the rear wheels and the like, and the drive force of the engine rotates the outer differential case 707 from the transfer and the 2–4 switching mechanism via the rear wheel power transmission system.

A clutch ring 741 is disposed in an inner portion of the outer differential case 707, and is supported so as to freely move in an axial direction in an inner periphery of the outer differential case 707.

The dog clutch 713 is constituted by a mating gear 743 and a mating gear 745. The mating gear 743 is formed in a left end portion of the clutch ring 741, and the mating gear 745 is formed in a right end portion of the inner differential case 709.

Further, openings 747 and 749 which oil flows into and out of respectively are provided in left and right sides of the outer differential case 707 at even intervals in a peripheral direction. Three leg portions 751 are provided in a right end of the clutch ring 741 at even intervals in a peripheral direction, and these leg portions 751 are engaged with the right opening 749 and protrude to an outer portion.

The clutch ring 741 is operated so as to be moved to right and left sides by the actuator 701 employing the plate having the gear teeth, as mentioned below. When the clutch ring 741 is operated so as to be moved to the left, the dog clutch 713 is engaged as shown in a lower half of FIG. 20, whereby the outer differential case 707 and the inner differential case 709 are connected. When the clutch ring 741 is returned to the right, the engagement of the dog clutch 713 is canceled as shown in an upper half of FIG. 20, whereby the outer differential case 707 and the inner differential case 709 are disconnected.

A thrust washer 753 exposed to an operating force output from the actuator 701 employing the plate having the gear teeth is disposed between a left end portion of the inner differential case 709 and the outer differential case 707, and the inner differential case 709 is positioned to a left side in an axial direction via the thrust washer 753.

The bevel gear type differential mechanism 711 is constituted by a plurality of pinion shafts 755, a pinion gear 757, left and right side gears 759 and 761 in an output side, and the like.

A leading end of each of the pinion shaft 755 is engaged with a through hole 763 formed at even intervals in a peripheral direction of the inner differential case 709, and a displacement prevention is applied by a spring pin 765.

The pinion gears 757 are rotatably supported on the respective pinion shafts 755, and the side gears 759 and 761 are engaged with the pinion gears 757 from the left and the right.

Respective boss portions 767 and 769 of the side gears 759 and 761 are supported by support portions 771 and 773 formed in the outer differential case 707, and left and right rear axles are respectively connected to spline portions 775 and 777 of the respective boss portions 767 and 769.

Further, thrust washers 779 are respectively disposed between the respective side gears 759 and 761 and the outer differential case 707, and are exposed to an engagement reaction force of the side gears 759 and 761.

Spherical washer portion 781 are formed in an inner periphery of the inner differential case 709, which are respectively opposed to back surfaces of the respective pinion gears 757, and bear a centrifugal force of the pinion gear 757 and an engagement reaction force applied to the pinion gears 757 due to the engagement with each of the side gears 759 and 761.

The support plate 715 (a first plate) is press-formed, and is constituted, as shown in FIGS. 20 to 27, by an annular plate portion 783, two fixed plate portions 785 integrally formed with the annular plate portion 783, three assembly recess portions 787 provided in an inner periphery of the annular plate portion 783 at even intervals in a peripheral direction, and two guide holes 789, four guide holes 791 and two stoppers 793 provided in the annular plate portion 783, and the like. The support plate 715 has a slightly larger thickness than that of the movable plate 719 and the cam plate 717, in order to stand against an axial force applied by the cam 721 and the springs 723 and 725.

Further, the cam plate 717 (a third plate) is press-formed, and is constituted by an annular plate portion 795, a plate portion 797 integrally extended from the annular plate portion 795 and having gear teeth, three assembly recess portions 799 provided in an inner periphery of the annular plate portion 795 at even intervals in a peripheral direction, three support projections 801 provided in adjacent in a peripheral direction of each of the assembly recess portions 799, three cam pieces 803 provided along an inner periphery of the annular plate portion 795 at even intervals in a peripheral direction, and the like. Three cam pieces 803 mentioned above are formed according to a press-forming, in order to achieve a height in correspondence to a moving amount (stroke) of the movable plate 719 in an axial direction.

The plate portion 797 is integrally formed with the annular plate portion 795, and is provided with a gear portion 805 in an outer periphery thereof. Further, the support projection 801 is constituted by an axial portion 807 formed in the annular plate portion 795, and a diametrical portion 809 (FIG. 27) formed in an end portion of the axial portion 807.

Each of the cam pieces 803 is constituted by an inclined surface 811, a hold surface 813 formed in a peripheral direction and having no cam angle, and a hold projection 815 formed between the inclined surface 811 and the hold surface 813.

Figure 27:
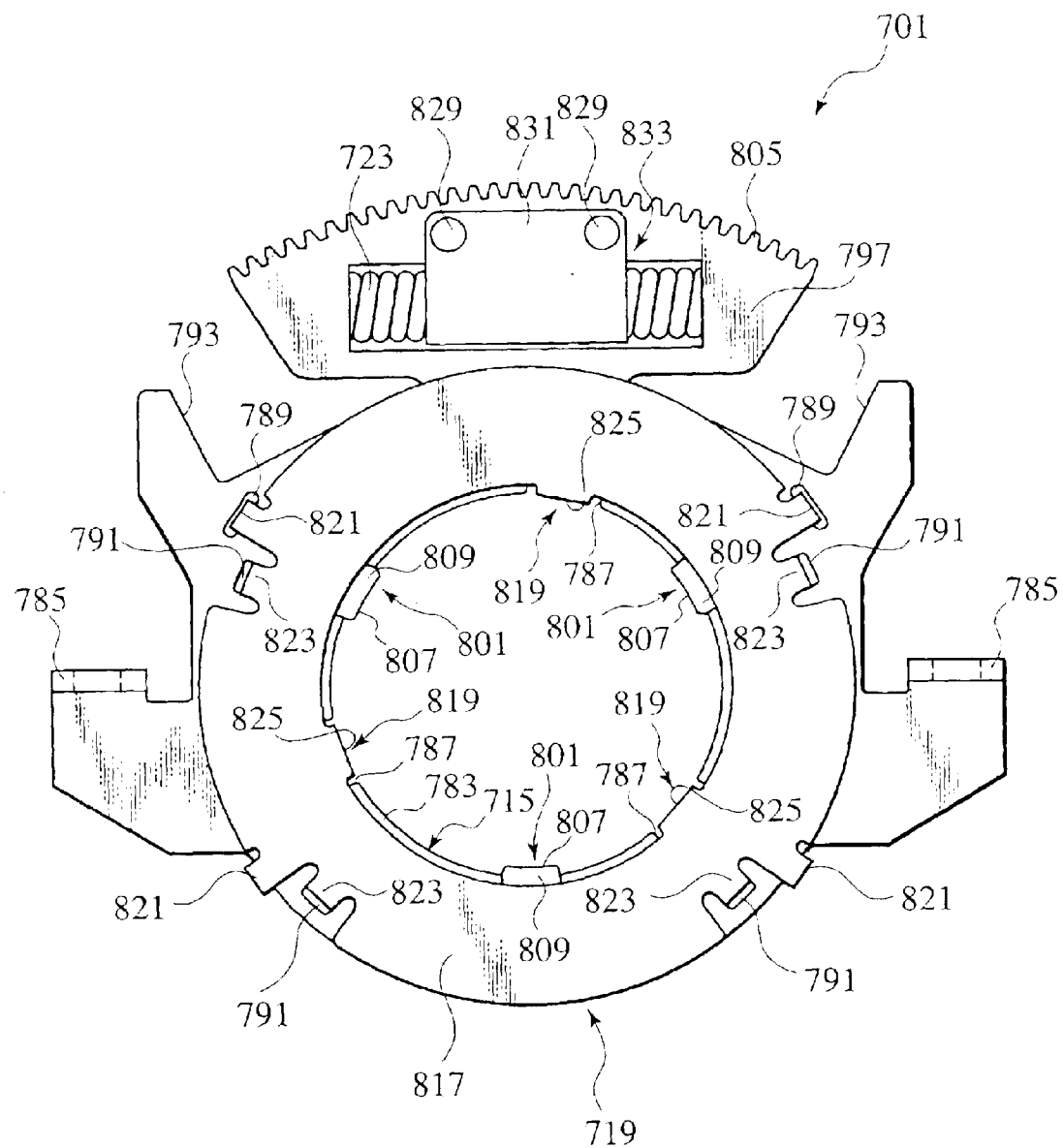
FIG. 27 is a back elevational view of the actuator according to the sixth embodiment of the present invention, and shows an assembling procedure.

The movable plate 719 is press-formed, and is constituted, as shown in FIG. 27, by an annular plate portion 817, three cam guide pieces 819 provided in an inner periphery of the annular plate portion 817 at even intervals in a peripheral direction, and every four guide pieces 821 and 823 provided in an outer periphery of the annular plate portion 817, and the like.

Further, each of the cam guide pieces 819 is constituted by an axial portion 825 formed in the annular plate portion 817, and a diametrical portion 827 formed in an end portion of the axial portion 825.

The coil spring 723 is held in a cylindrical retainer portion 133 formed between a spring guide 831 fixed to a plate portion 797 (the cam plate 717) having the gear teeth by rivets 829 and the plate portion 797, as shown in FIGS. 21 to 27. As mentioned below, when the cam plate 717 rotates in two directions, both end portions of the coil spring are brought into contact with the stoppers 793 of the support plate 715.

Figure 25:
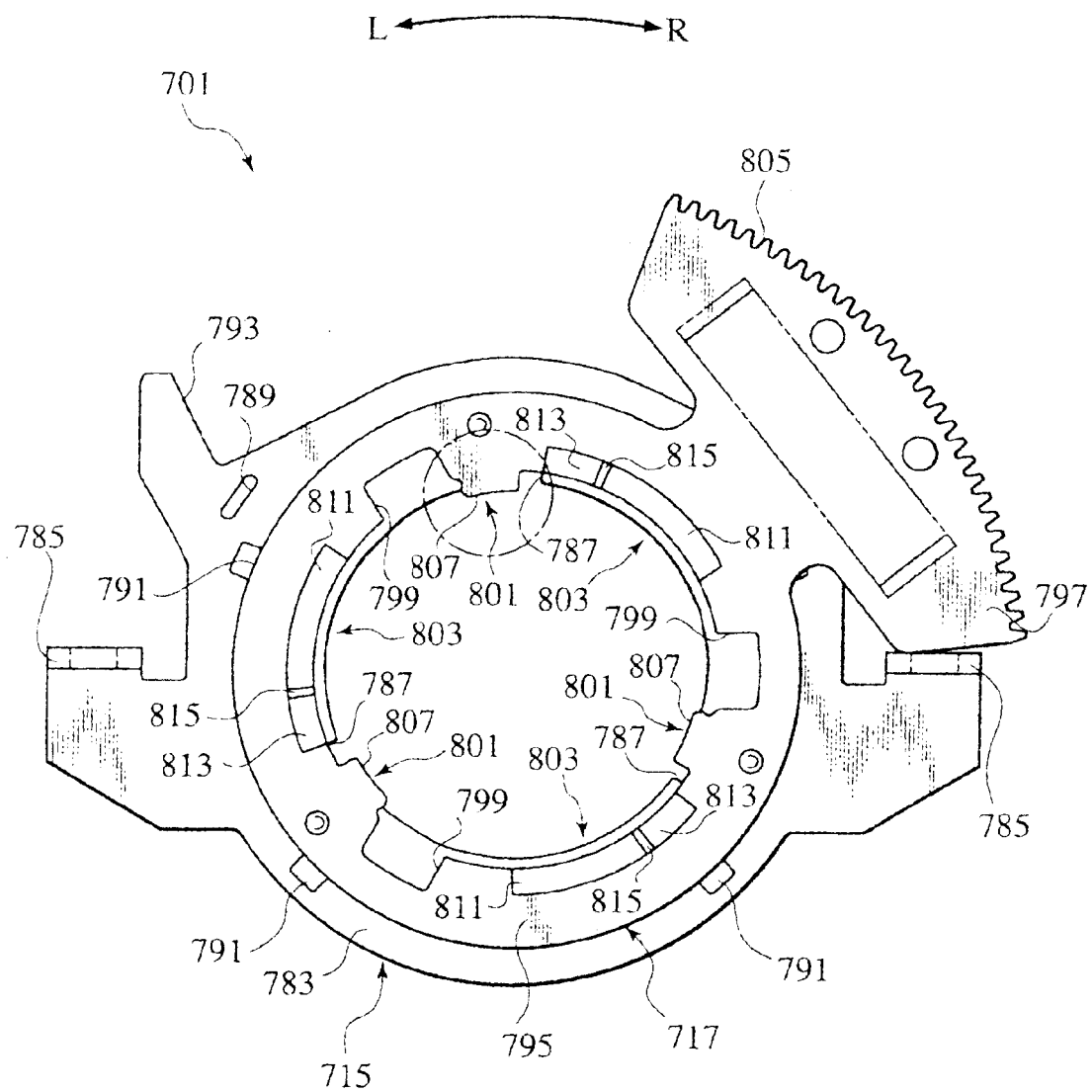
FIG. 25 is a front elevational view of the actuator according to the sixth embodiment of the present invention, and shows an assembling procedure.
Figure 26:
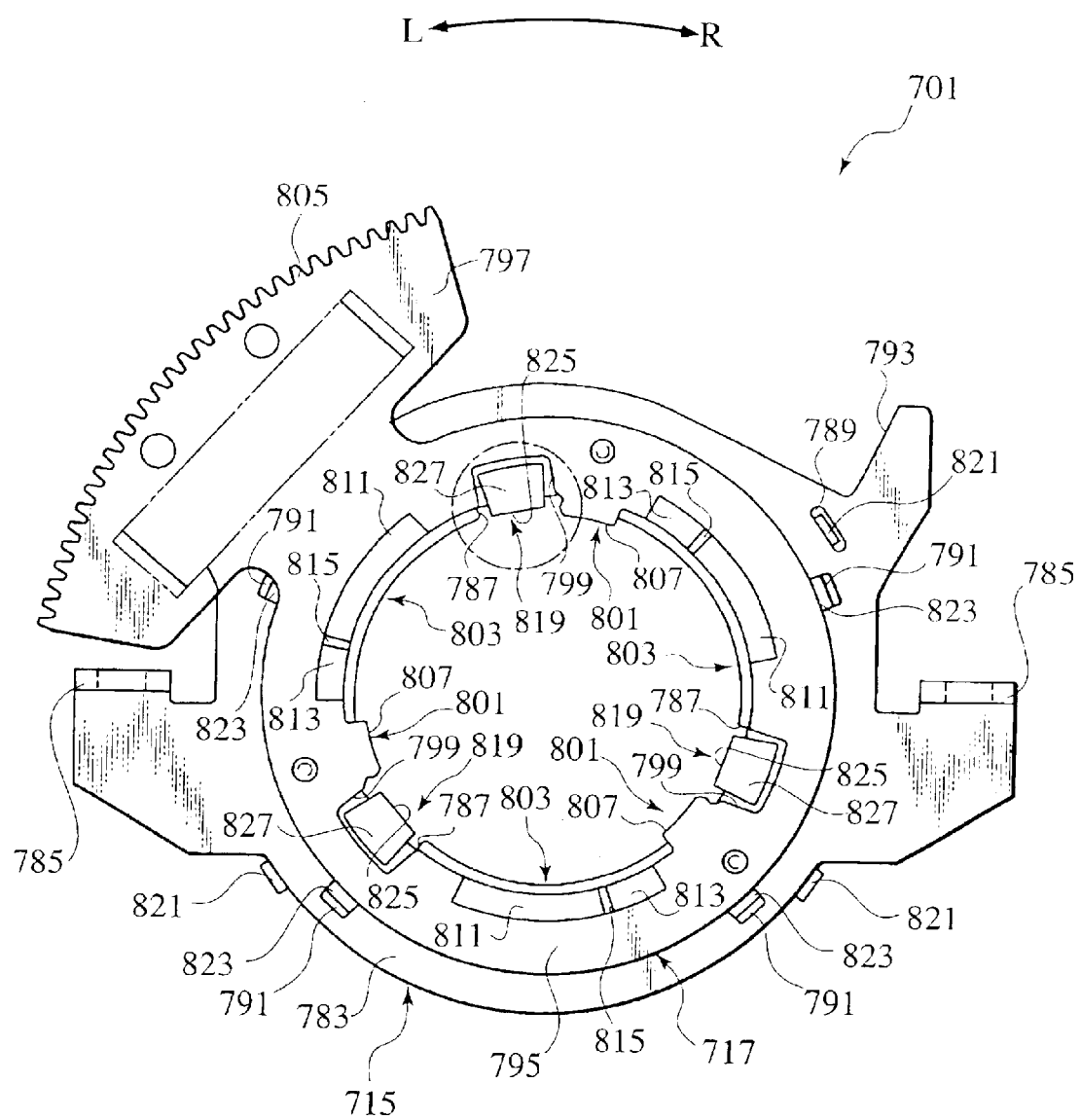
FIG. 26 is a front elevational view of the actuator according to the sixth embodiment of the present invention, and shows an assembling procedure.

The support plate 715, the cam plate 717, the movable plate 719 and the coil spring 723 are assembled as shown in FIGS. 25 to 27 according to the following order.

Step 1: As shown in FIG. 25, three support projections 801 of the cam plate 17 are respectively inverted to three assembly recess portions 787 of the support plate 715.

Step 2: In this state, the axial portion 807 and the diametrical portion 809 of each of the support projections 801 are engaged with the inner peripheral end side of the annular plate portion 783 in the support plate 715 by rotating the cam plate 717 in a direction of an arrow L in FIG. 25, whereby the support plate 715 and the cam plate 717 are positioned with each other in an axial direction so as to be centered.

Step 3: After mounting the wave ring (the shift spring) between the guide piece 821 and the guide piece 823 of the movable plate 719, each of the cam guide pieces 819 of the movable plate 719 is inserted to the recess portions 787 and 799 in a state where the assembly recess portion 787 of the support plate 715 and the assembly recess portion 799 of the cam plate 717 are aligned with each other, as shown in FIG. 26.

In this case, the shift spring (the wave ring) may be integrally formed with the movable plate 719 (the shift spring), or may employ an independent spring (for example, a coil spring).

Further, two guide pieces 821 of the movable plate 719 are respectively engaged with two guide holes 789 of the support plate 715, an outer periphery of the support plate 715 is held by the other two guide pieces 821, and four guide pieces 823 are respectively engaged with four guide holes 791 of the support plate 715.

In this case, the guide pieces 821 holding the outer periphery of the support plate 715 center the movable plate 719 and the support plate 715 with each other, and the other guide pieces 821 and 823 engaging with the guide holes 789 and 799 prevent the movable plate 719 and the support plate 715 from rotating and center the movable plate 719 and the support plate 715.

Step 4: From the state in the step 3, the cam plate 717 is rotated in a direction of an arrow R in FIG. 26, and each of the cam pieces 803 is fitted to the diametrical portion 827 of each of the cam guide pieces 819 in the movable plate 719, whereby the cam 721 is structured.

Step 5: As shown in FIG. 27, the coil spring 723 is set to the retainer portion 133 of the cam plate 717 (the plate portion 797 having the gear teeth).

Step 6: The spring guide 831 is put on the set coil spring 723.

Step 7: The spring guide 831 is fixed to the plate portion 797 by the rivet 829.

As mentioned above, each of the plates 715, 717 and 719 and the coil spring 723 are assembled by a reduced number of steps and in an extremely easy manner.

In this case, if the coil spring 723 is mounted to the cam plate 717 prior to the steps 2 and 4, the coil spring 723 is brought into contact with the stopper 793 of the support plate 715 at a time of rotating the cam plate 717 according to these steps, whereby the cam plate 717 can not be rotated to the amount of necessary angle. Accordingly, the coil spring is mounted after the step 4, as mentioned above.

As mentioned above, in a state where the assembly is finished, the support plate 715, the cam plate 717 and the movable plate 719 are centered with each other, and the cam plate 717 can freely rotate with respect to the support plate 715 and the movable plate 719.

Figure 22:
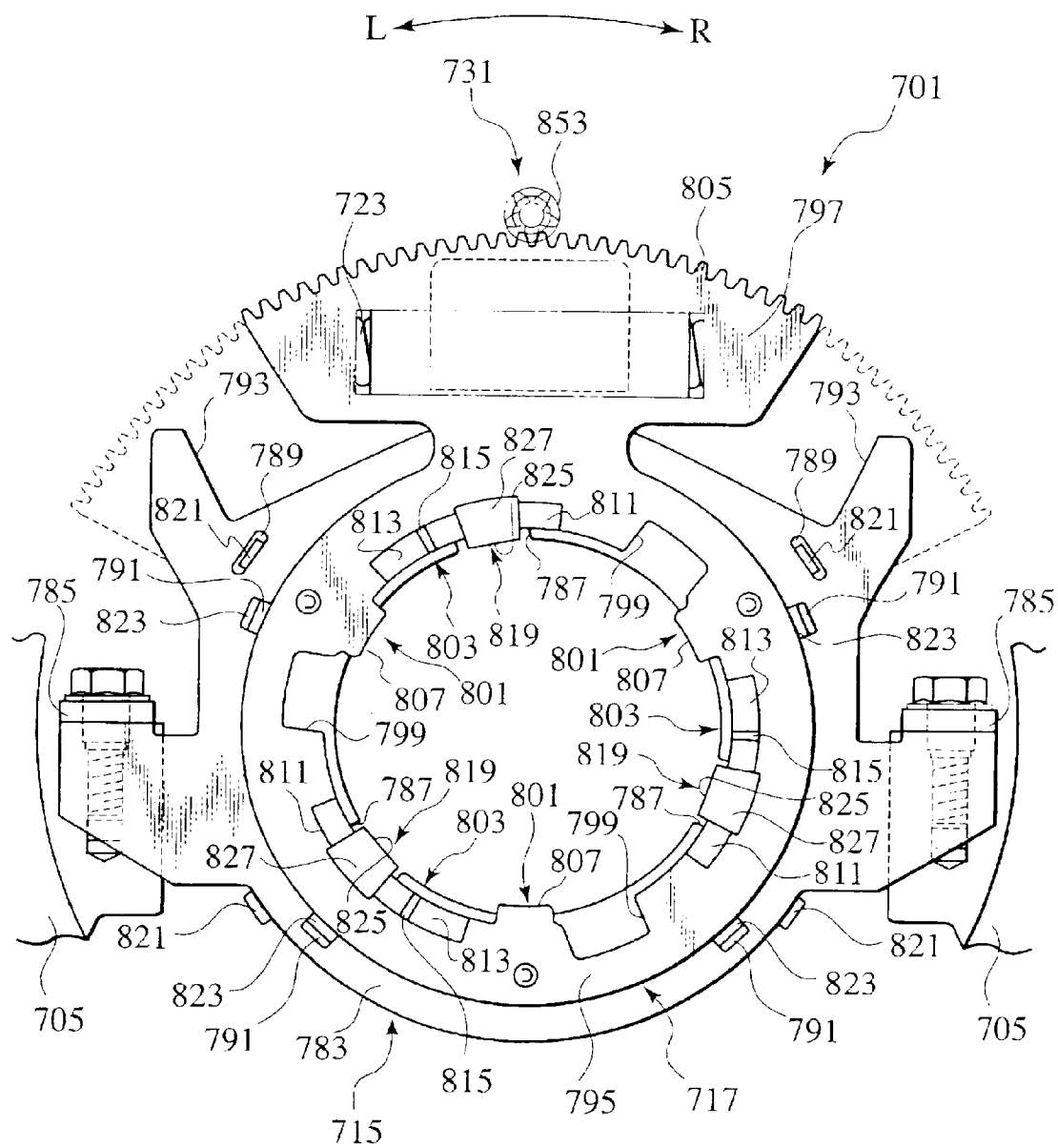
FIG. 22 is a front elevational view of the actuator according to the sixth embodiment of the present invention, and shows a state where a movable plate exists in a center.

As shown in FIGS. 20 and 22, each of the fixed plate portions 785 of the support plate 715 is fixed to the differential carrier 705 by a bolt 835.

The cam 721 is constituted by the respective cam pieces 803 of the cam plate 717 and the respective cam guide pieces 819 (the diametrical portions 827) of the movable plate 719, as mentioned above.

As shown in FIG. 20, the return spring 725 is integrally formed in the retainer 837 of the clutch ring 741. An arm portion 839 formed in the retainer 837 is fixed to each of the leg portions 751 of the clutch ring 741 by being folded, and a ring 841 is disposed between the retainer 837 (the return spring 725) and a right end portion of the outer differential case 707.

The clutch ring 741 and the retainer 837 can integrally oscillate in an axial direction, and the return spring 725 energizes the clutch ring 741 in a direction of canceling the engagement of the dog clutch 713 (rightward).

FIG. 20 shows an example in which the shift spring 727 is integrally formed with the movable plate 719. Further, the energizing force of the shift spring 727 is set stronger than an energizing force of the return spring 725, thereby moving the movable plate 719 and the clutch ring 741 in a direction of engagement of the dog clutch 713 (leftward).

In this case, the return spring 725 may be constituted by employing an independent spring (for example, a coil spring), in addition to the return spring 725 integrally formed with the movable plate 719.

As shown in FIG. 21, a casing 843 of the electric motor 729 is mounted to a mounting hole 845 provided in the differential carrier 705 with an O-ring 847 put therebetween. The electric motor 729 can rotate in two directions, and the lead wire 849 is connected to an in-vehicle battery via a controller.

A pinion gear 853 is spline-connected to an output shaft 853 of the electric motor 729. An oil seal 855 is disposed between the output shaft 853 and the casing 843, and the pinion gear 853 is supported to the casing 843 by a ball bearing 857.

The gear set 731 is constituted by a pinion gear 853 close to the electric motor 729, and a gear portion 805 of the plate portion 797 (cam plate 717), amplifies a rotation torque of the electric motor 729, and rotates the cam plate 717.

The controller executes an engagement and disengagement operation of the dog clutch 713 in the following manner, simultaneously connects the dog clutch 713 and the 2–4 switching mechanism at a time of switching from the two-wheel drive state to the four-wheel drive state, and simultaneously disconnect the dog clutch 13 and the 2–4 switching mechanism at a time of switching from the four-wheel drive state to the two-wheel drive state.

Further, at a time of executing the engagement and disengagement operation of the dog clutch 713, the controller executes a time control of rotating the electric motor 729 in two directions (in one direction and opposite direction) for a predetermined time (angle). When the electric motor 729 rotates for the predetermined time, the cam plate 717 is rotated in a predetermined direction by a predetermined angle via the gear set 731.

FIG. 22 shows a state where the cam plate 717 exists at a center position of an entire angle of rotation (width of rotation).

Figure 23:
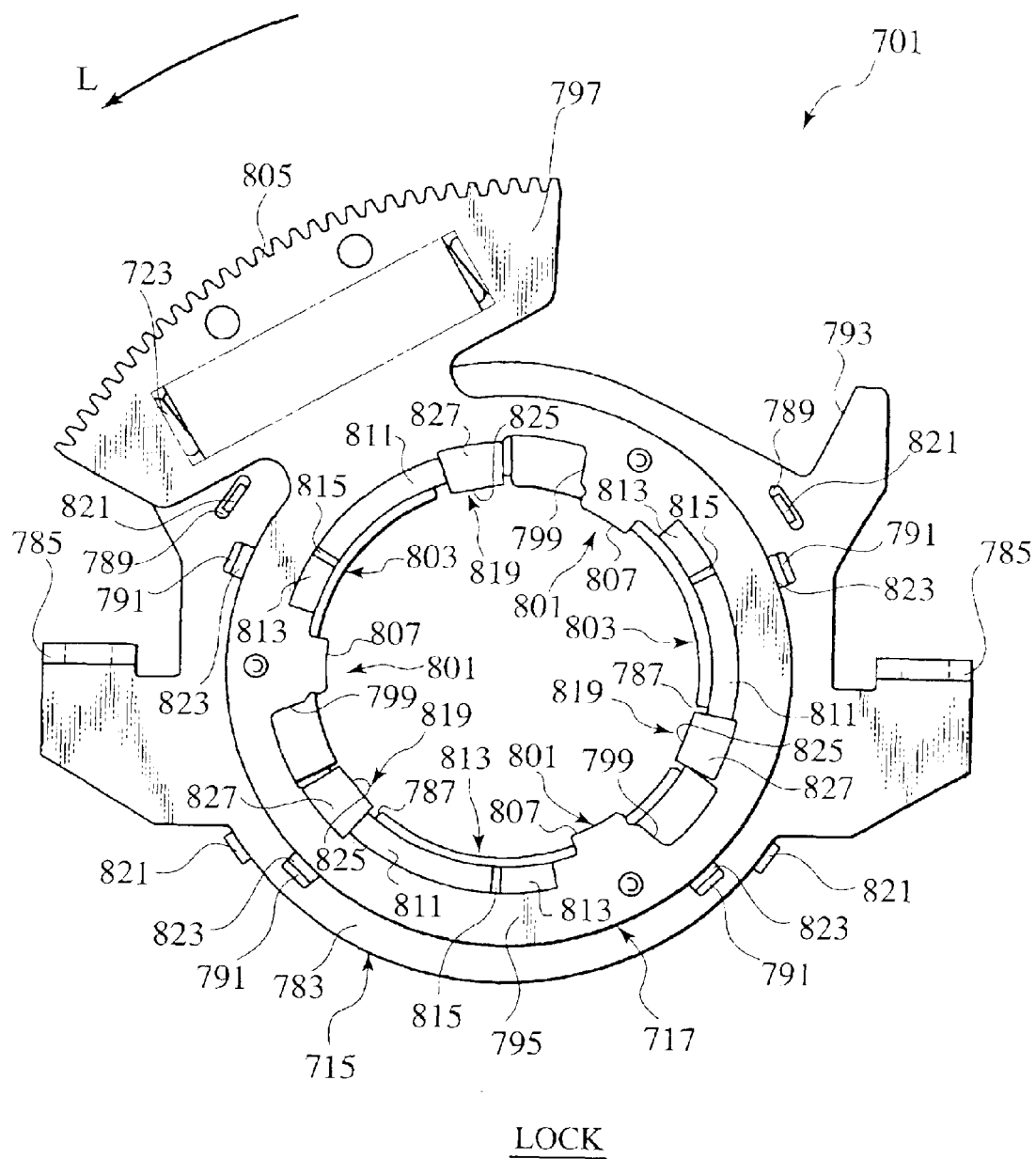
FIG. 23 is a front elevational view of the actuator according to the sixth embodiment of the present invention, and shows a state where the movable plate exists in a first side.

FIG. 23 shows a state where the cam plate 717 is rotated at a predetermined angle to a direction L (the 4WD position), from the position in FIG. 22.

At this time, the pinion gear 853 of the gear set 731 is engaged in one end portion of the gear portion 805, and an one end portion of the coil spring 723 on the cam plate 717 strikes the fixed plate portion 785 (the stopper) in one side of he support plate 715 so as to prevent the cam plate 717 from excessively rotating, thereby preventing the pinion gear 853 from coming off from the gear portion 805.

Further, as shown in FIG. 23, the cam plate 717 finishes the contact with the movable plate 719 by the cam 721 just before the coil spring 723 strikes the fixed plate portion 785, and the rotation speed is accelerated by the torque of the electric motor 729. However, the coil spring 723 absorbs and reduces the impact by means of the deflection at a time of striking the fixed plate portion 785.

The cam plate 717 rotates up to the 4WD position, the diametrical portion 827 of the cam guide piece 819 in the movable plate 719 is at a position descending along the inclined surface 811 of the cam piece 803 in the cam plate 717, in each of the cam 721. As shown in a lower half portion in FIG. 20, the diametrical portion 827 is pressed against the annular plate portion 795 of the cam plate 717 due to the energizing force of the shift spring 727 under this condition, and each of the cams 721 stops operation.

When each of the cams 721 stops operation, the movable plate 719 and the clutch ring 741 move to the left side by the shift spring 727, the dog clutch 713 is engaged, and the vehicle becomes in the four-wheel drive state.

Further, at this time, the shift spring 727 constitutes a waiting mechanism, and engages the dog clutch 713 in the case where phases of the mating gears 743 and 745 are aligned.

Figure 24:
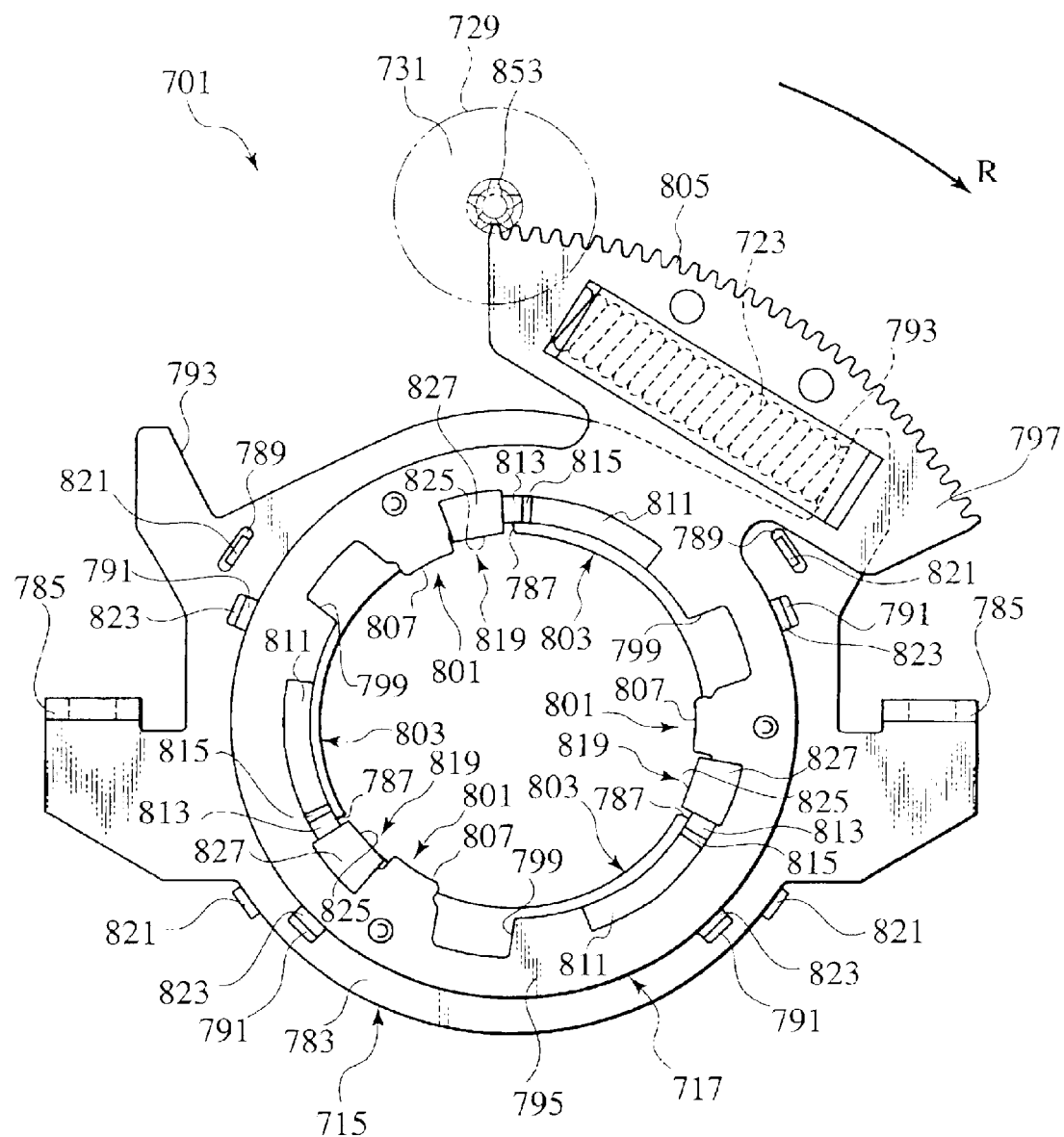
FIG. 24 is a front elevational view of the actuator according to the sixth embodiment of the present invention, and shows a state where the movable plate exists in a second side.

FIG. 24 shows a state where the plate portion 797 is rotated up to a direction R (the 2WD position) at a predetermined angle, from the position in FIG. 22.

At this time, the pinion gear 853 of the gear set 731 is engaged with another end portion of the gear portion 805, and another end portion of the coil spring 723 on the cam plate 717 strikes another side fixed plate portion 785 (the stopper) of the support plate 715, thereby preventing the cam plate 717 from excessively rotating and preventing the pinion gear 853 from coming off from the gear portion 805.

Further, as shown in FIG. 24, the cam plate 717 finishes contact with the movable plate 719 in the cam 721 just before the coil spring 723 strikes the fixed plate portion 785, and the rotation speed is accelerated by the torque of the electric motor 729. However, when the coil spring 723 strikes the fixed plate portion 785, the coil spring 723 absorbs and reduces the impact owing to the deflection.

When the cam plate 717 rotates up to the 2WD position, the diametrical portion 827 of the cam guide piece 819 in each of the cams 721 climbs up the inclined surface 811 of the cam piece 803, gets over the hold projection 815 so as to be held by the hold surface 813, and actuates the cam 721.

When each of the cams 21 is operated, each of the cam guide pieces 819 (the movable plate 719) moves to the right side in the axial direction based on the cam thrust force, and compresses the shift spring 727. When the shift spring 727 is compressed, the movable plate 719 (the clutch ring 741) moves to the right side by the energizing force of the return spring 725 as shown in an upper half portion in FIG. 20, the engagement of the dog clutch 13 is canceled, and the vehicle becomes in the two-wheel drive state.

A spring constant of the coil spring 723 is set in a range that the pinion gear 853 does not displace from the gear portion 805 at a time when the cam plate 717 further rotates at a deflection amount of the coil spring generated at a time when the coil spring strikes the fixed plate portion 785 (the stopper) in both of the 4WD position and the 2WD position.

Further, since the hold projections 815 hold the respective cam guide pieces 819 on the hold surfaces 813 by means of a check function, the vehicle is prevented from fluctuating to the four-wheel drive state from the two-wheel drive state against the driver's will, even in the case where disturbance factors such as a vibration, an impact and the like are applied to the vehicle during traveling, under a state where the electronic motor 729 is stopped.

Further, since none of the hold surfaces 813 and the annular plate portion 795 provided in both sides of the inclined surfaces 811 of the cam pieces 803 have the angle of cam, the rotation torque is not applied to the cam plate 717 during the period that the cam guide pieces 819 (the diametrical portions 827) are on the hold surfaces 813 and the annular plate portion 795 even when the energizing force of the shift spring 727 is applied, and the vehicle is not erroneously switched to the two-wheel drive state or the four-wheel drive state against the driver's will.

Accordingly, the state of the cam 721 is kept both before the operation (at the operation stopping time) and after the operation, and the vehicle is stably kept in the four-wheel drive state and the two-wheel drive state, so that it is possible to stop the electric motor 729 at the other time than the time of operating the cams 721.

In the four-wheel drive state, since the dog clutch 713 and the 2–4 switching mechanism are respectively connected as mentioned above, the drive force of the engine is transmitted to the outer differential case 707 from the 2–4 switching mechanism via the rear wheel power transmission system, and the inner differential case 709 is rotated via the dog clutch 713. This rotation is distributed to the side gears 759 and 761 from the pinion shaft 755 via the pinion gear 757, and is transmitted to the right and left rear wheels via the respective axles.

When the vehicle becomes in the four-wheel drive state, a traveling property, an escaping property and a stability on a punishing road or the like are improved. Further, when a difference of drive resistance between the rear wheels occurs during traveling on the punishing road, the drive force of the engine is differentially distributed to the right and left rear wheels according to an autorotation of each of the pinion gears 757.

Further, in the two-wheel drive state, since the connections of the dog clutch 713 and the 2–4 switching mechanism are respectively cancelled, an area from the inner differential case 709 to the rear wheels is disconnected by the dog clutch 713, and these elements become in a free rotation state. Further, the power transmission system from the 2–4 switching mechanism to the outer differential case 707 is disconnected from both of the drive force of the engine and the interlocking rotation by the rear wheels, and the rotation is stopped.

In the two-wheel drive state where the rotation of the rear wheel power transmission system from the 2–4 switching mechanism to the outer differential case 707 is stopped, an abrasion is reduced in the various portions of the rear side power transmission system and a durability is improved, as well as the vibration is reduced and a ride quality is improved. Further, an engine load is reduced to the amount of reduction in the rotation resistance, and a specific fuel consumption is improved.

In the outer differential case 707, there are formed a spiral oil groove 859 on an inner periphery of the boss portion 733 in addition to the openings 747 and 749, and the same spiral oil groove is also formed on an inner periphery of the boss portion 735. Further, in portions opposing to the thrust washers 779 and 779, there are formed diametrical oil grooves 861 and 863 respectively communicated with the spiral oil grooves 859.

Since the openings 747 and 749 are formed in an outer side portion of the outer differential case 707 in a diametrical direction, the openings 747 and 749 are always dipped into the oil in the oil reservoir formed in the differential carrier 705, and the oil flows in and out through the openings 747 and 749 in correspondence to the rotation of the outer differential case 707.

Further, the oil in the oil reservoir is swept up by the rotation of the outer differential case 707 (the ring gear 739), and the swept-up oil is accelerated movement by a screw pump effect of the spiral oil grooves 859, and flows in the inner portion of the outer differential case 707 through the oil grooves 861 and 863 and gaps of the thrust washers 779 and 779 and the like.

The oil flowing in the outer differential case 707 is supplied to the mating portions of the respective gears 757, 759 and 761 constituting the differential mechanism 711, the sliding portion between the pinion shafts 755 and the pinion gears 757, the sliding portion between the outer differential case 707 and the inner differential case 709, the sliding portion between the outer differential case 707 and the clutch ring 741, the dog clutch 713 (the mating gears 743 and 745), and the like so as to lubricate and cool these elements.

Further, the lower portion of the actuator 701 employing the plate having the gear teeth is dipped into the oil reservoir, and the sliding portions between the rotated cam plate 717, and the support plate 715 and the movable plate 719, the cam 721 and the like are lubricated and cooled.

Further, the gear set 731 is lubricated and cooled by the swept oil mentioned above.

In each of the lubricated and cooled portions mentioned above, the abrasion is reduced by the supplied oil, whereby the durability is improved. Further, a friction resistance is reduced in each of the sliding portions, and the specific fuel consumption is improved.

The actuator 701 and the rear differential 703 are structured in the manner mentioned above.

In the actuator 701, even when the cam plate 717 finishes the contact in the cam 721 and rotates at a high speed by the torque of the electric motor 729, the impact is reduced by the deflection of the coil spring 723 with respect to the fixed plate portion 785 (the stopper). Accordingly, it is possible to prevent the pinion gear 853, the gear portion 805, each of the fixed plate portions 785 (the stopper), the electric motor 729 and the like from being damaged, a durability and a reliability are improved, and a normal function can be kept long.

Further, in comparison with the structure employing the position sensor, it is possible to achieve the structure at an extremely low cost.

Further, the structure employing the coil spring 723 for the impact force absorbing means is easily carried out, and a further cost reduction can be achieved.

Further, it is possible to freely adjust the impact force absorbing function by replacing the coil spring 723 by a coil spring having a different strength.

Further, the actuator 701 for converting the rotation torque of the electric motor 729 into the operating force of the dog clutch 713 does not require the expensive pump, the piston and cylinder, the shift mechanism and the like differently from the structure using the fluid pressure type actuator. Accordingly, it is possible to reduce the number of the parts to the amount thereof, make the structure simple and achieve a low cost.

Further, the rear differential 703 employing the actuator 701 using the gear plate does not require a wide arrangement space for the pressure lines and the like, is structured light and compact, is improved in an in-vehicle property, is not required to be changed in the differential carrier 705, and is prevented a cost increase in correspondence to the change.

Further, the actuator 701 and the rear differential 703 get relief from a reduction in function and an influence of pressure fluctuation caused by the pressure leakage, and are widely improved in the performance, the stability and the reliability. Further, it is avoidable that the pressure lines are reinforced in seal in each of the portions, and a cost increase is generated in correspondence thereto.

The contents of Japanese Patent Application No. 2002-228498 (filed on Aug. 6, 2002) and Japanese Patent Application No. 2002-263989 (filed on Sep. 10, 2002) are incorporated herein by reference in its entirety.

Although the invention has been described above by reference to certain embodiments of the invention, the invention is not limited to the embodiments described above. Modifications and variations of the embodiments described above will occur to those skilled in the art, in light of the above teachings.

For example, in the actuator according to the present invention, the operated apparatus is not limited to the clutch. The clutch may employ not only the mating clutch (the dog clutch) in each of the embodiments, but also a friction clutch such as a multiple disc clutch and a cone clutch. Further, the differential mechanism is not limited to the bevel gear type differential mechanism, but may be constituted by a planetary gear type differential mechanism, a differential mechanism in which a side gear in an output side is connected by a pinion gear rotatably received in a receiving hole in a differential case, a differential mechanism using a worm gear, and the like.

What is claimed is:

1. An actuator for engagement and disengagement operation of a power transmission device, comprising:
    a first plate being fixed;
    a second plate being movable in a direction of the engagement and disengagement operation so as to be engaged with the first plate;
    a third plate disposed opposite to the second plate with respect to the first plate, the third plate rotatably engaged with the second plate;
    a drive unit engageable with the third plate so as to rotate the third plate;
    a cam mechanism converting a rotation of the third plate to a movement of the second plate in the direction of the engagement and disengagement operation; and
    a retaining device retaining an engagement of the third plate with the drive unit, wherein the second plate moved by the cam mechanism drives the power transmission device in the direction of the engagement and disengagement operation.

2. The actuator of claim 1, wherein:

the third plate comprises a gear portion and the drive unit comprises a pinion gear for engagement with the gear portion.

3. The actuator of claim 2, wherein:

the retaining device comprises a guide portion surrounding the gear portion, both ends of the guide portion being integrally connected with the gear portion, and the both ends of the guide portion abut the pinion gear so as to retain the engagement.

4. The actuator of claim 1, wherein:

the retaining device comprises a stopper restricting a rotation span of the third plate, the stopper formed on the first plate.

5. The actuator of claim 4, wherein:

the third plate comprises an absorber abutting the stopper.

6. The actuator of claim 5, wherein:

the absorber comprises a resilient piece.

7. The actuator of claim 4, wherein:

the third plate comprises a thick wall portion for abutting the stopper.

8. The actuator of claim 1, wherein:

the retaining device comprises an absorber restricting a rotation span of the third plate, the absorber formed on the first plate.

9. The actuator of claim 8, wherein:

the absorber comprises a resilient piece.

10. The actuator of claim 8, wherein:

the absorber comprises a spring.

11. The actuator or claim 1, wherein:

the retaining device comprises a thick portion restricting a rotation span of the third plate, the thick portion formed on the third plate.

12. The actuator of claim 1, further comprising:

a deceleration device decelerating the third plate after the third plate drives the cam mechanism and before the retaining device restricts the rotation of the third plate.

13. The actuator of claim 12, wherein:

the deceleration device comprises a projection integrally formed with the first plate so as to decelerate the third plate by a friction.

14. The actuator of claim 1, wherein:

the drive unit comprises an electric motor.

15. An intermissive power transmission device, comprising:

a pair of power transmission members;

a clutch for intermission of power transmission;

a first plate being fixed;

a second plate being movable in a direction of the engagement and disengagement operation so as to be engaged with the first plate;

a third plate disposed opposite to the second plate with respect to the first plate, the third plate being rotatably engaged with the second plate;

a drive unit engageable with the third plate so as to rotate the third plate;

a cam mechanism converting a rotation of the third plate to a movement of the second plate in the direction of the engagement and disengagement operation; and a retaining device retaining an engagement of the third plate with the drive unit, wherein the second plate moved by the cam mechanism drives the power transmission device in the direction of the engagement and disengagement operation.

16. The intermissive power transmission device of claim 15, wherein:

the first plate, the second plate and the third plate are respectively and integrally formed from a flat material.

* * * * *